March 15, 1966  H. A. HARTMAN  3,241,025
MOTOR ARMATURE AND FIELD CIRCUITS CONTROL SYSTEM
Filed Nov. 5, 1962  6 Sheets-Sheet 1
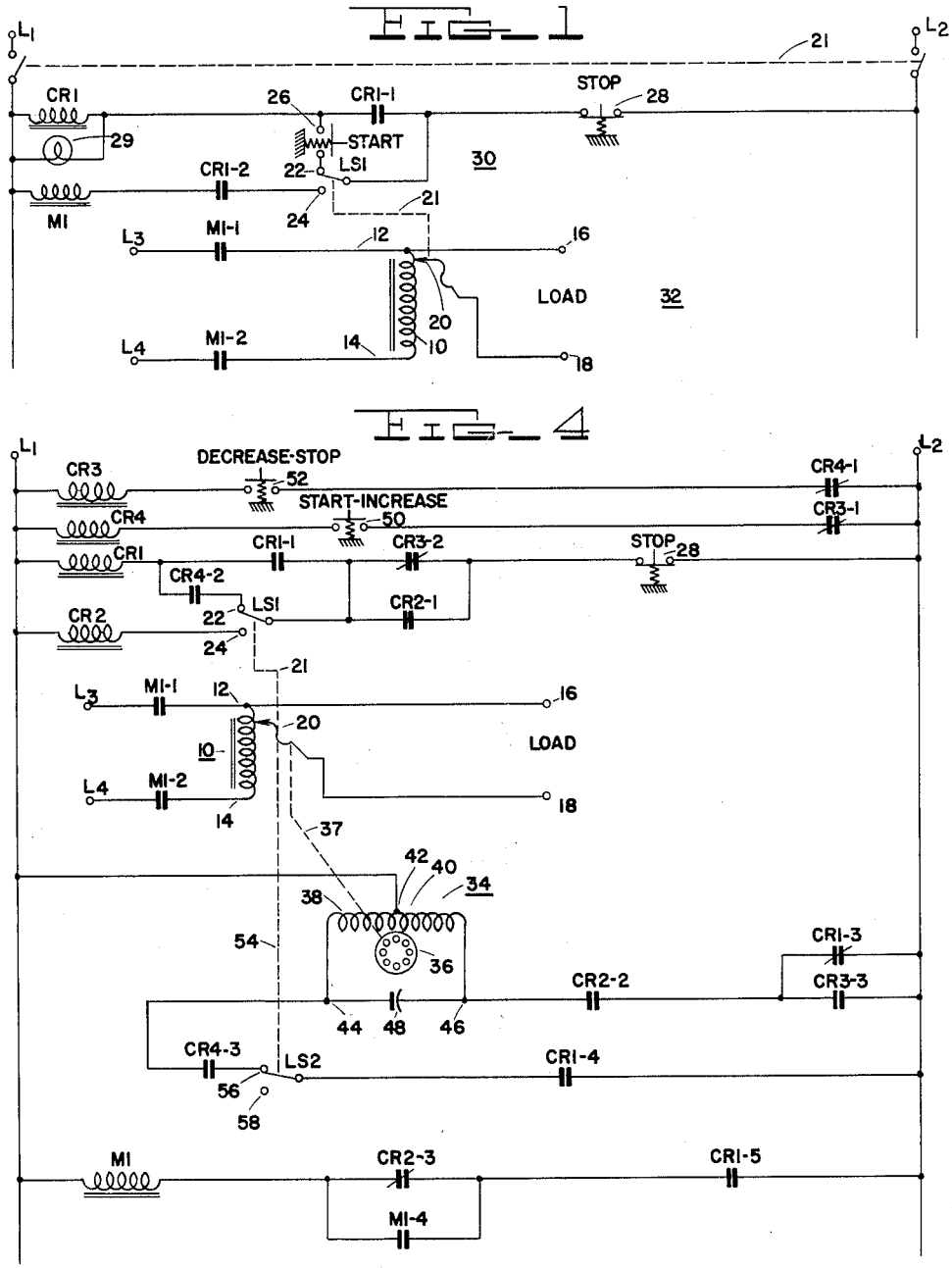
INVENTOR.
HARRY A. HARTMAN
BY Wood, Gust & Irish
ATTORNEYS March 15, 1966  H. A. HARTMAN  3,241,025
MOTOR ARMATURE AND FIELD CIRCUITS CONTROL SYSTEM
Filed Nov. 5, 1962  6 Sheets-Sheet 2
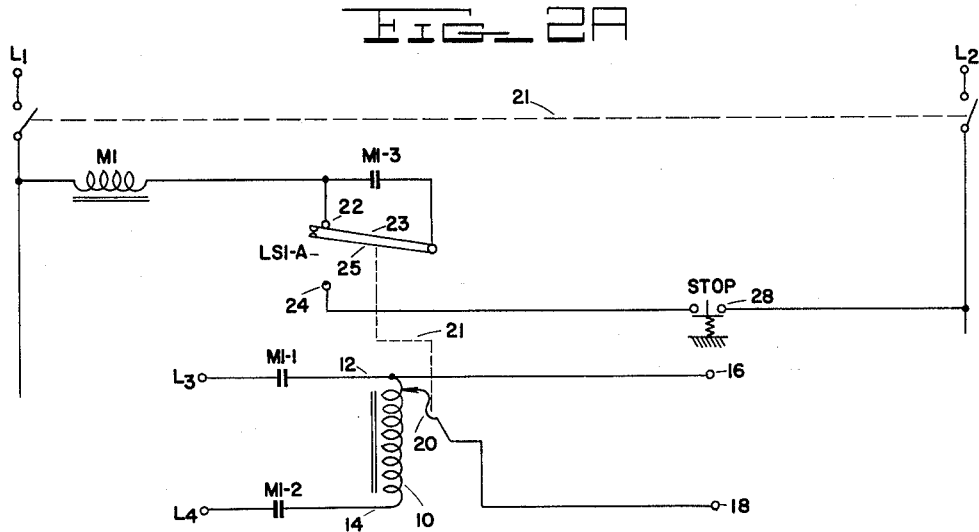
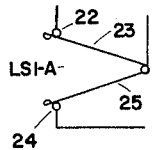
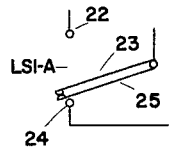
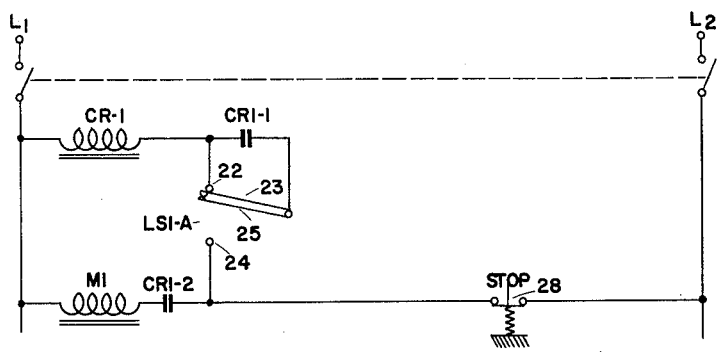
INVENTOR.
HARRY A. HARTMAN
BY Wood, Gust & Irish
ATTORNEYS

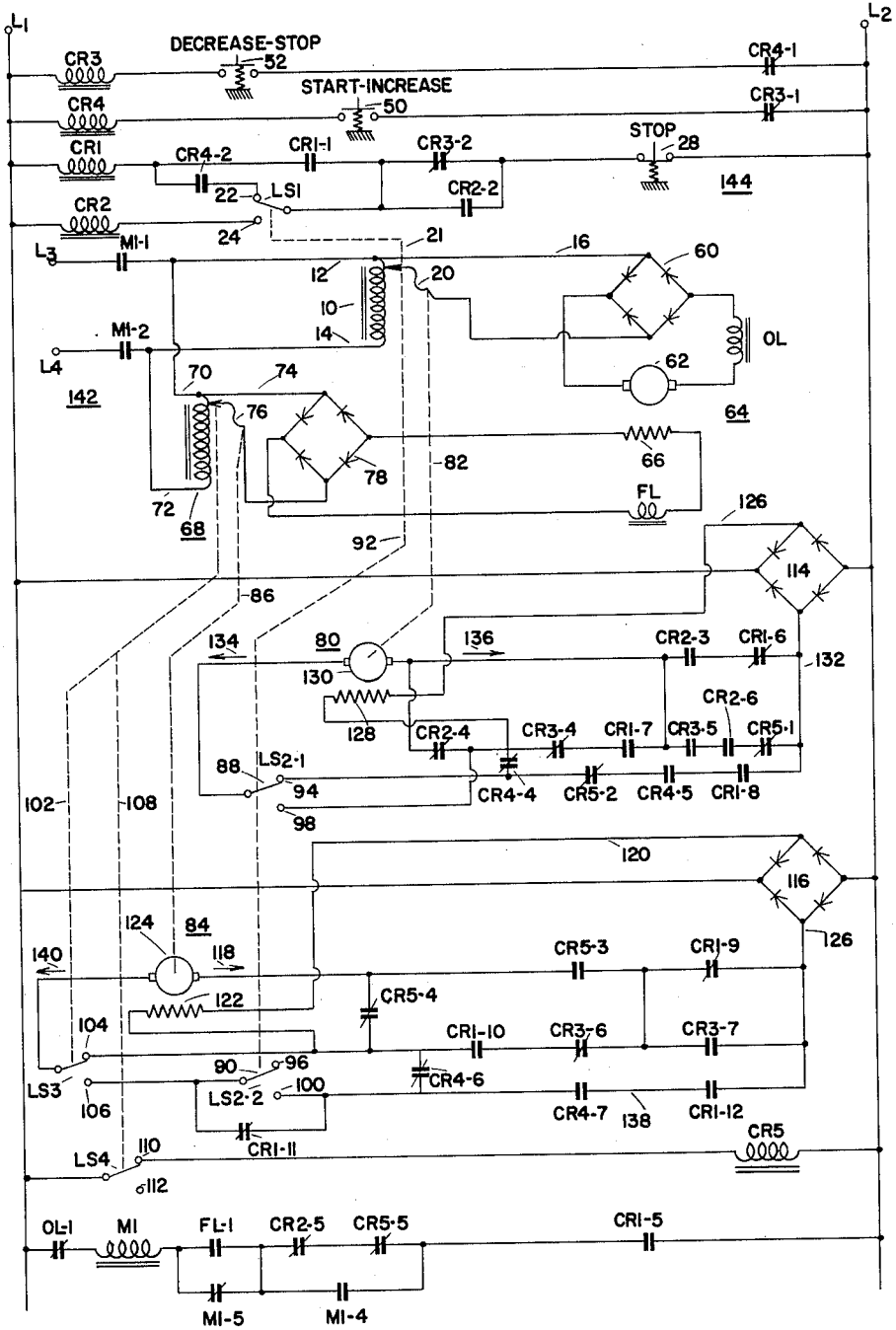

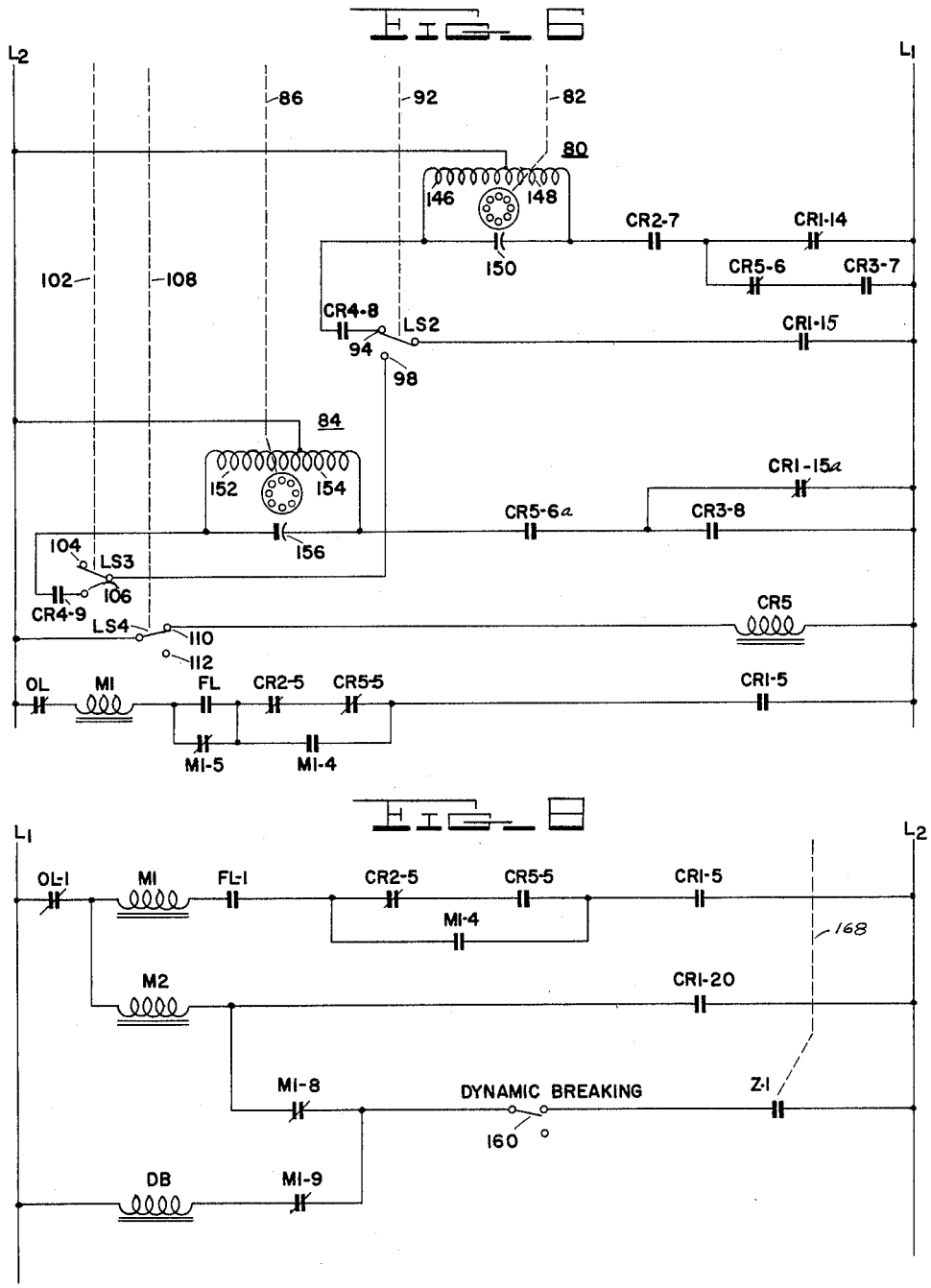

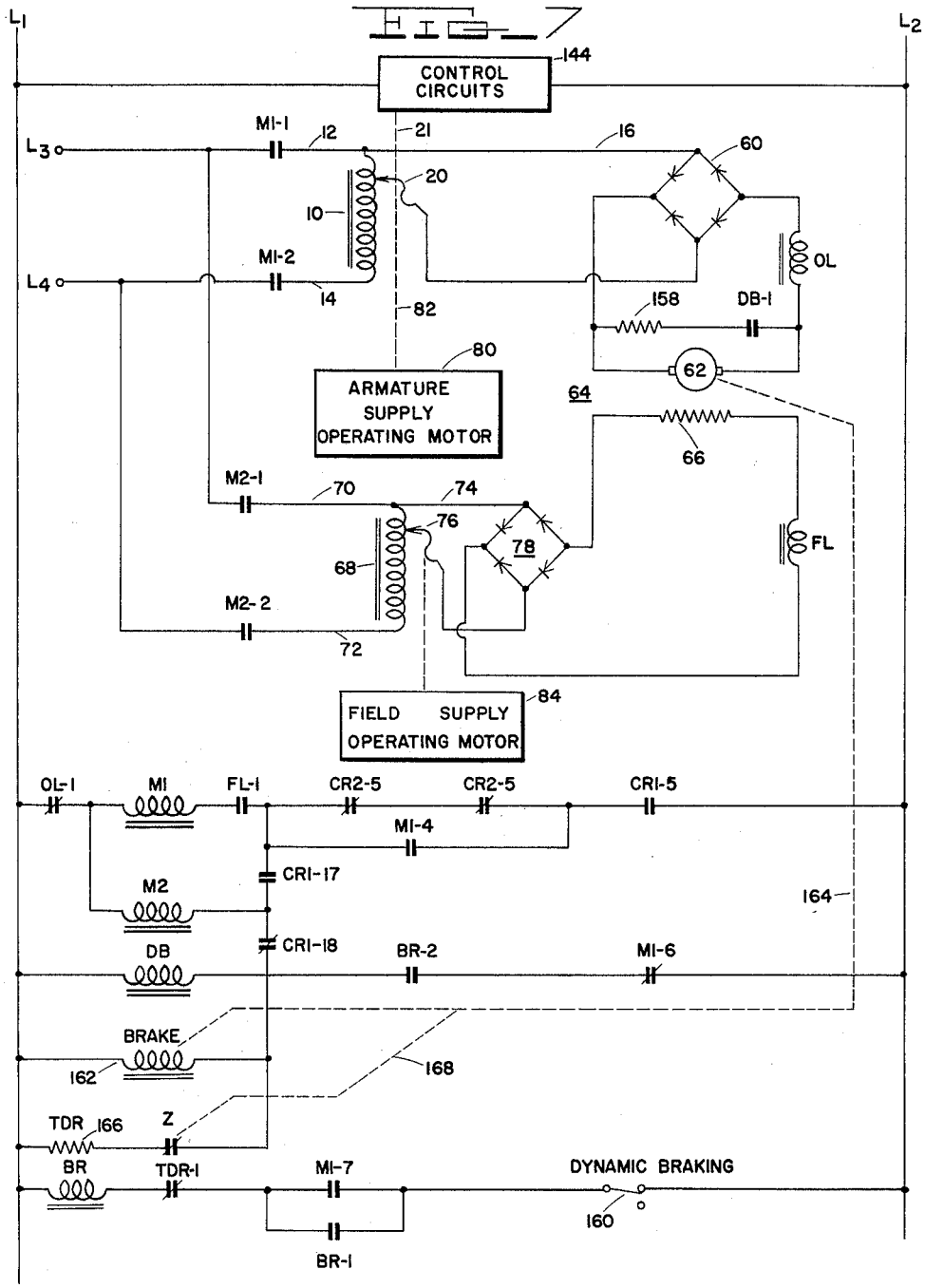

March 15, 1966     H. A. HARTMAN     3,241,025
MOTOR ARMATURE AND FIELD CIRCUITS CONTROL SYSTEM
Filed Nov. 5, 1962     6 Sheets-Sheet 6
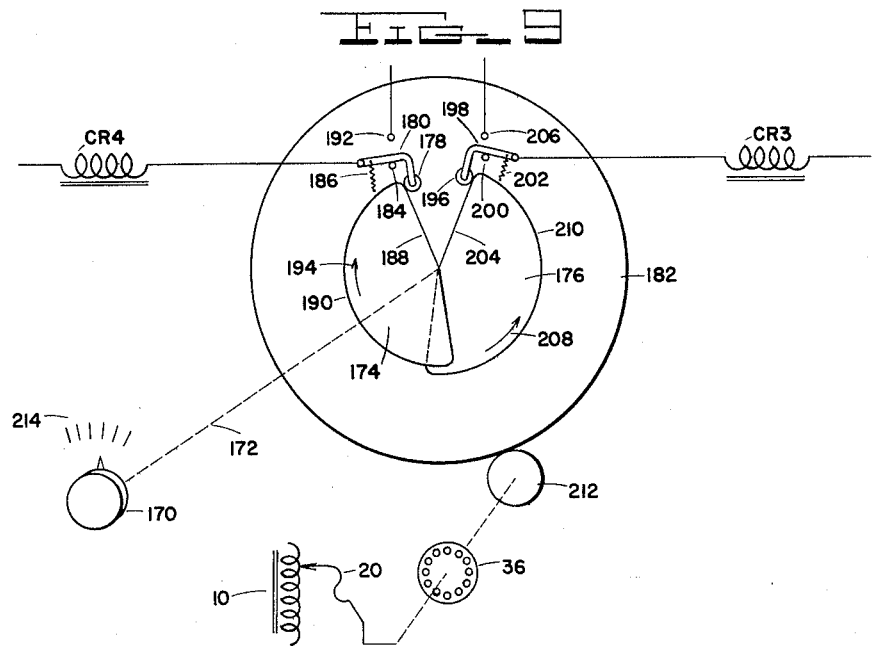
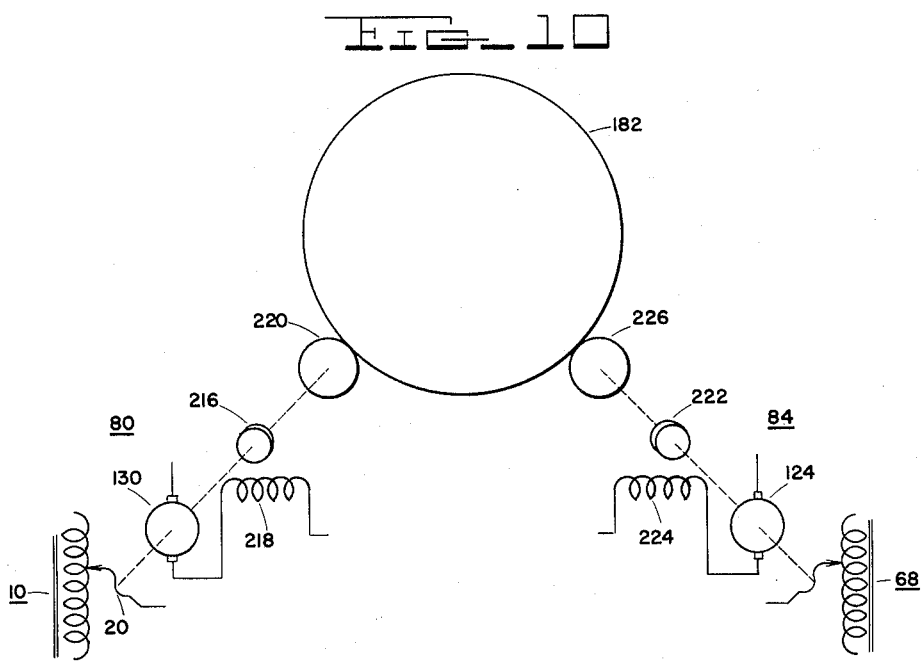
*INVENTOR.*
HARRY A. HARTMAN
BY Hood, Gust & Irish
ATTORNEYS

United States Patent Office 3,241,025
Patented Mar. 15, 1966

3,241,025
MOTOR ARMATURE AND FIELD CIRCUITS
CONTROL SYSTEM
Harry A. Hartman, Fort Wayne, Ind., assignor to Hood,
Gust & Irish, Fort Wayne, Ind., a partnership
Filed Nov. 5, 1962, Ser. No. 235,493
26 Claims. (Cl. 318—338)

This invention relates generally to electrical control circuits, and more particularly to a circuit for use in controlling a flow of energy and for providing a predetermined sequence of control functions therefor.

There are numerous instances in systems for delivering a selectively adjustable flow of energy, be it electrical, mechanical, hydraulic, or pneumatic, wherein in order to prevent damage to the system and/or erroneous operation, it is desirable once the flow of energy has been interrupted to return the flow controlling device to a predetermined position before again initiating the flow of energy. For example, in a hydraulic system incorporating a selectively adjustable flow-controlling valve, if the fluid flow is suddenly interrupted for any reason, it may be desirable to close the valve before again applying pressure to the system. Likewise, in a system providing mechanical movement between first and second limits, if for any reason the movement has been interrupted, it may be desirable to return the movable element to its initial position before initiating another movement toward the other position. In an electrical system where means such as a variable voltage autotransformer is provided for selectively controlling the voltage applied to a load, it again may be desirable once the connection to the source has been opened, to restore the voltage controlling means to a zero or near zero output voltage position before again applying the energizing potential thereto.

In the particular case of a control system for a variable speed, direct current motor drive, such as employed in extrusion presses, rolling mills, printing press drives, wire drawing, and the like, it is desirable to provide control circuitry to assure full field starting to obtain maximum torque, to prevent field weakening until the armature voltage is maximum, and to prevent a decrease in the armature voltage until full field is obtained. Furthermore, it is desirable that such a control system permit the operator to start and continue to operate the drive from a zero armature voltage-maximum field voltage condition to a maximum armature voltage-minimum field voltage condition by use of a single speed-increase button or lever and conversely to permit the operator to go from the minimum field voltage-full armature voltage condition through maximum field voltage-maximum armature voltage down to full field voltage-zero armature voltage, and on to shutting down the entire system by merely holding a speed-decrease button or a small actuating lever. In such a system, it is also desirable that in the event that the drive system is suddenly stopped by means of the stop button, the field voltage be rapidly returned automatically to the maximum value and the armature voltage rapidly returned automatically to the zero value before the drive again may be energized.

It may further be desirable in such a drive system that upon momentary actuation of the stop button, a dynamic breaking circuit automatically be established with a load grid resistor connected across the armature of the drive motor and the field voltage, if not at a maximum, rapidly increased to maximum. It may additionally be desirable to combine mechanical braking with dynamic braking.

It is accordingly an object of the invention to provide an improved electrical control system for use in controlling a flow of energy.

Another object of the invention is to provide an improved electrical control system for use in controlling a flow of energy wherein a predetermined sequence of control operations is desired or required.

A further object of the invention is to provide an improved control system for use in controlling a flow of energy wherein following interruption of the energy flow, the controlling means must be returned to a predetermined position before the energy flow may be resumed.

A still further object of the invention is to provide an improved control system for a voltage-controlling device wherein the device is automatically restored to a predetermined position upon interruption of the energization thereof.

Yet another object of the invention is to provide an improved control system for use with a variable speed direct current motor drive which assures full field starting, prevents field weakening until armature voltage is maximum, and prevents decrease of armature voltage until full field voltage is obtained.

Further objects and advantages of the invention will become apparent by reference to the following description and accompanying drawings, and the features of novelty which characterize the invention will be pointed out with particularly in the claims annexed thereto and forming a part of the specification.

The invention in its broader aspects provides a source of power having output means movable between normal and second positions and selectively adjustable means for supplying energy to the power source. A circuit is provided for preventing energization of the source without first returning the movable means to its normal position, the circuit comprising limit switch means actuated by the movable means to a first position when the movable means is in its normal position and away from its first position when the movable means is away from its normal position. Means are provided establishing a first circuit energized through the limit switch in its first position and means are provided responsive to energization of the first circuit for maintaining the first circuit energized when the limit switch means is moved away from its first position. Means are provided for actuating the actuable means responsive to energization of the first circuit and means are provided for selectively de-energizing the first circuit thereby de-energizing the second circuit and de-actuating the actuating means so that the first circuit cannot be re-energized without first returning the movable means to its normal position thereby actuating the limit switch to its first position.

In the drawing:

FIG. 1 is a schematic illustration of the invention in its simplest form;

FIGS. 2A, B, and C show a modification of the system of FIG. 1;

FIG. 3 shows a further modification of the system of FIG. 1;

FIG. 4 is a schematic illustration showing the invention embodied in a motor driven variable voltage system;

FIG. 5 is a schematic illustration of the invention embodied in a variable speed direct current motor drive system;

FIG. 6 is a schematic illustration showing a modification of a system of FIG. 5;

FIG. 7 is a schematic illustration showing a modification of the system of FIGS. 5 or 6 incorporating dynamic braking;

FIG. 8 shows a modification of the system of FIG 7;

FIG. 9 shows a modification of the system shown in FIG. 4; and

FIG. 10 shows a modification of the system shown in FIG. 5.

Referring now to FIG. 1 of the drawing, there is shown a variable voltage autotransformer 10 having its input terminals 12 and 14 respectively connected to terminals L3 and L4 of a suitable source of single phase alternating current potential (not shown) by contacts M1–1 and M1–2. Variable voltage autotransformer 10 has one output terminal 16 directly connected to input terminal 12 and its other output terminal 18 connected to adjustable voltage element 20, which in the illustrated embodiment is manually adjusted. Line contacts M1–1 and M1–2 are actuated by operating coil M1, contacts M1–1 and M1–2 being closed thereby to connect autotransformer 10 for energization from source L3, L4 responsive to energization of operating coil M1.

In the system shown, it is desired that the load connected to the output terminals 16, 18 initially be energized only when the adjustable element 20 of the variable voltage autotransformer 10 is at or near the zero output voltage position. To accomplish this objective, a suitable source of control voltage (not shown) is provided connected to lines L1 and L2 by line switch 21. A limit switch LS1 is provided mechanically connected to the adjustable element 20 of the variable voltage autotransformer 10, as shown by the dashed line 21, limit switch LS1 being actuated to a first position 22 when the adjustable element 20 is at the desired zero or minimum voltage position, and to a second position 24 when the adjustable element 20 is moved away from the predetermined position. Limit switch LS1 is preferably of the type which is normally spring-biased to its position 24, referred to as the "normally closed" position, being urged to its position 22, referred to as the "normally open" position, by adjustable element 20 of autotransformer 10 when element 20 is in its zero voltage position, and immediately returning to its position 24 when element 20 moves away from its zero voltage position.

A manually actuated "start" switch 26 and a manually actuated "stop" switch 28 are provided together with a control relay having an operating coil CR1 and normally open contacts CR1–1 and CR1–2 where are respectively closed responsive to energization of coil CR1. It will be seen that the start switch 26, the limit switch LS1 in its first or normally open position 22 and the stop switch 28 serially connect relay coil CR1 across lines L1, L2.

When the adjustable element 20 of the autotransformer 10 is in its predetermined zero or minimum voltage position, thus actuating limit switch LS1 to its first position 22, momentary closing of the start switch 26 will energize relay coil CR1. Contacts CR1–1 are connected in shunt across start switch 26 and limit switch LS–1 and thus when coil CR1 is momentarily energized responsive to momentary closing of switch 26, contacts CR1–1 will close sealing in the coil CR1 so that it remains energized despite the subsequent opening of either the start switch 26 or movement of limit switch LS–1 to its position 24.

It will be seen that contacts CR1–2 and limit switch LS1 in its second or normally closed position 24 together with stop switch 28 serially connect operating coil M1 across lines L1, L2. Thus, it will be seen that with coil CR1 energized, as above described, contacts CR1–2 will be closed and therefore, as soon as the operator manually moves adjustable element 20 of autotransformer 10 away from the zero or minimum voltage position, limit switch LS1 will be actuated to its second or normally closed position 24 thereby to energize operating coil M1 which in turn closes contacts M1–1 and M1–2 to connect the autotransformer 10 to the lines L3 and L4 for energization. A pilot light 29 may be connected across the coil of relay CR–1 thus to indicate when the coil is energized.

It will now be seen that with the adjustable element 20 of the autotransformer 10 at any manually adjusted setting, if stop button 28 is momentarily actuated, coil CR1 will be de-energized thus opening contacts CR1–1 and contacts CR1–2 and in turn de-energizing coil M1 and opening contacts M1–1 and M1–2 to de-energize autotransformer 10. With contacts CR1–1 opened responsive to de-energization of coil CR1, the coil CR1 will remain de-energized despite subsequent reclosing of stop switch 28. It will now be seen that in order again to energize operating coil M1 to close contacts M1–1 and M1–2 so as to energize autotransformer 10, it is necessary for the operator manually to move adjustable element 20 back to its zero or minimum voltage position so as to actuate limit switch LS1 to its first or normally open position 22. In this position, momentary actuation of start switch 26 will again energize coil CR1 and in turn operating coil M1 as above described.

It will be observed that it is not necessary to actuate the stop switch 28 in order to de-energize the autotransformer 10; if the opeartor manually moves the adjustable element 20 back to the zero or minimum voltage position thereby actuating limit switch LS1 to its first or normally open position 22, the energizing circuit of operating coil M1 is thereby broken and contacts M1–1 and M1–2 will be opened. However, under these circumstances, coil CR1 remains energized through its contacts CR1–1 and stop switch 28 so that subsequent adjustment of the movable element 20 away from the zero or minimum voltage position thereby actuating limit switch LS–1 to its second or normally closed position 24 will again energize coil M1 and close contacts M1–1 and M1–2 to energize the autotransformer 10. It will also be seen that start switch 26 may be eliminated in which case line switch 21 is utilized.

It will be readily comprehended that the voltage-controlling device may be an adjustable rheostat rather than a variable voltage autotransformer in which event lines L3, L4 may be connected to either a source of direct current or alternating current. It will further be seen that the control circuit, generally indicated at 30, is equally usable with a load system other than the electrical voltage-controlling system shown and generally indicated at 32. Thus, the control circuit 30 may be employed in conjunction with a hydraulic system in which the controlling element 10 would take the form of a manually-actuated flow-controlling valve with its flow-controlling element coupled to limit switch LS1, and the contacts M1–1, 2 of the system 32 would take the form of a solenoid-actuated valve controlled by the coil M1 of a control circuit 30. Thus, following interruption of the fluid flow by means of the solenoid-actuated valve, it would be necessary to close or substantially close the manually-actuated valve before the fluid flow could be restored.

It will also be seen that the control circuit 30 is usable in conjunction with a system providing mechanical motion. Thus, the device 10 of the load system 32 may take the form of a hydraulic or pneumatic cylinder providing linear mechanical output motion responsive to application of hydraulic or gas pressure. Likewise, the device may then take the form of an electric motor of any type again providing mechanical motion. In either event, once application of the hydraulic or gas pressure or energizing voltage, as the case may be, is terminated, it would be necessary to restore the element mechanically moved by the cylinder or motor to a reference position before the hydraulic pressure or input power again can be applied. It will further be readily seen that further contacts may be provided in series with the stop switch 28 to de-energize the control relay coil CR1 in response to the occurrence of any predetermined condition, such as an overload condition in the case of the system illustrated in FIG. 1.

Referring now to FIGS. 2A, B and C, in which like elements are indicated by like reference numbers, there is shown a modification of the circuit of FIG. 1 employing a limit switch LS1–A of the make-before-break type, eliminating the control relay CR–1, and the start switch 26. Limit switch LS1–A has two contact-carrying blades 23, 25, and is mechanically connected to adjustable element 20 of autotransformer 10. Both blades 23, 25 are actuated to position 22 when element 20 is at the desired zero or minimum voltage position, as shown in FIG. 2A. When element 20 is moved slightly away from the zero position, blade 25 moves to position 24 with blade 23 remaining at position 22, as shown in FIG. 2B. When element 20 is moved further away from the zero position, both blades 23, 25 are actuated to position 24 as shown in FIG. 2C.

Here the coil of main contactor M1 is connected between line L1 and switch position 22, and its normally open auxiliary contacts M1-3 are connected across switch position 22 and blades 23, 25. Switch position 24 is connected to line L2 by stop switch 28. Stop switch 28 is not required for operation of the system, but is provided for operator convenience since the main contactor M1 can be de-energized without returning the control handle, crank, knob, or handwheel, which moves element 20, to the zero or minimum voltage position.

With line switch 21 closed and element 20 in its zero voltage position, blades 23, 25 of limit switch LS1-A are actuated to position 22 and the coil M1 is not energized. Moving element 20 slightly away from its zero voltage position allows blade 25 to move to position 24 with blade 23 still in position 22. Coil M1 is now connected across lines L1, L2 by blades 23, 25 and stop switch 28 and will thus be energized closing its contacts M1-3, and also its main contacts M1-1 and M1-2. The closed contact M1-3 now shunts blades 23, 25 so that coil M1 is sealed in and remains energized when blade 23 moves to position 24 responsive to further advance of element 20.

It will be seen that with element 20 advanced so that blades 23, 25 of limit switch LS1-A are at position 24 momentary actuation of stop switch 28 will de-energize coil M1 thus opening its contacts M1-1, M1-2 and M1-3, thereby breaking the seal across blades 23, 25. With contact M1-3 opened, coil M1 will remain de-energized despite subsequent reclosing of stop switch 28. In order to re-energize coil M1, it is necessary first to move element 20 back to its zero voltage position and then to move it away therefrom.

It will also be seen that it is not necessary for the operator to actuate stop switch 28 in order to de-energize coil M1 and autotransformer 10; element 20 may be moved back to the zero voltage position thus actuating blades 23, 25 to position 22 thereby to open the energizing circuit of coil M1.

It will be apparent that if too low a control voltage is present, or no control voltage at all, movement of element 20 will not result in energization of coil M1 so autotransformer 10 will not be energized. If, however, control voltage suddenly appears at lines L1, L2 while element 20 is sufficiently advanced so that blades 23, 25 are in position 24, coil M1 will not be energized since its contact M1-3 is open. Further with the system energized, failure of the control voltage at lines L1, L2 will de-energize coil M1, as in the case of actuation of stop switch 28, so that the system cannot be re-energized without restoring element 20 to the zero voltage position. It is thus seen that under voltage, no voltage, and voltage failure protection is inherently provided, not only in the circuit of FIG. 2, but also in the circuit of FIG. 1.

Referring now to FIG. 3, wherein like elements are still indicated by like reference numerals, there is shown a circuit combining the features of FIGS. 1 and 2. It will be seen that in the circuit of FIG. 2, if the operator advances element 20 away from the zero of minimum voltage position too rapidly, the coil M1 may not be energized for a sufficiently long period during the intermediate position of blades 23, 25 of limit switch LS1-A in FIG. 2B to overcome the inertia of the mass of the main contacts M1-1, M1-2, and thus contacts M1-3 may not have closed by the time blades 23, 25 move to the position shown in FIG. 2C. Further, in the event main contacts M1-1 and M1-2 are required to carry heavy current, the coil M1 may have a current requirement higher than the capacity of the contacts of limit switch LS1-A.

The circuit of FIG. 3 thus again employs control relay CR1, preferably of the high speed type, with its normally open sealing contacts CR1-1 connected across position 22 and blades 23, 25 of limit switch LS1-A, and with its normally open contacts CR1-2 serially connecting the coil M1 with stop switch 28 across lines L1, L2. The addition of the high speed control relay CR1 removes the inrush current surges and de-energization voltage transients of coil M1 from the contacts of limit switch LS1-A, and also provides a high speed, low inertia means for sealing in coil M1, thus permitting rapid advance of element 20 away from the zero voltage position. It will be seen that the circuit of FIG. 3 incorporates the undervoltage, no voltage, and voltage failure protection features of the circuits of FIGS. 1 and 2.

Referring now to FIG. 4 in which like elements are indicated by like reference numerals, there is shown a system in which the movable element 20 of the adjustable voltage autotransformer 10 is actuated by a drive motor 34, shown here as being of the two-phase, permanent-capacitor, instantly-reversible type. Motor 34 has a rotor 36 connected to actuate movable element 20 by a suitable speed reducer, as shown by the dashed line 37. Motor 34 includes two field winding sections 38 and 40 serially connected with their midpoint 42 connected to line L1 and with their ends 44 and 46 respectively connected by capacitor 48.

In the illustrated embodiment, a starting-speed increasing control circuit is provided comprising a control relay having an operating coil CR4 connected for energization across lines L1 and L2 by a "start-increase" switch 50 and normally closed contacts CR3-1 of control relay CR3. A speed decreasing-stop control circuit is provided comprising a control relay having coil CR3 connected for energization across lines L1, L2 by "decrease-stop" switch 52 and normally closed contacts CR4-1 of control relay CR4.

In this circuit, normally open contacts CR1-1 and normally closed contacts CR3-2 are provided in series with relay coil CR1 in addition to stop switch 28. Normally open contacts CR4-2 connect coil CR1 to position 22 of limit switch LS-1. Normally open contacts CR1-1 are thus connected in shunt across serially connected normally open contacts CR4-2 and limit switch LS-1 in its first position 22. Normally open contacts CR2-1 are connected in shunt across normally closed contacts CR3-2. Thus, it will be seen that when the "Start-increase" switch 50 is closed thereby energizing coil CR4, and with coil CR3 de-energized, and further with limit switch LS1 in its first or normally open position 22 responsive to the movable element 20 of variable voltage output transformer 10 being in its zero or minimum-voltage position, coil CR1 will be energized through the now-closed contacts CR4-2, limit switch LS1 in its first position 22, the normally closed contacts CR3-2 and the stop switch 28, coil CR1 again being sealed in by its contacts CR1-1.

Energization of relay coil CR1 closes its contacts CR1-5 thereby energizing operating coil M1 through normally closed contact CR2-3 of control relay CR2 thereby closing line contacts M1-1 and M1-2 to energize autotransformer 10. Operating coil M1 is sealed in when energized by its auxiliary contacts M1-4 shunted across normally closed contacts CR2-3, as shown.

A second control relay CR2 is provided having its coil energized through limit switch LS1 in its second or normally closed position 24, normally closed contacts CR3-2 and stop switch 28. Relay coil CR2 is sealed in through its normally open contacts CR2-1 shunting normally closed contacts CR3-2 when LS1 is in its second position 24. As will be hereinafter described, relay CR2 establishes a holding circuit when limit switch LS-1 is in its second position 24 to permit the motor 34 automatically to return the movable element 20 of autotransformer 10 to the zero or minimum output voltage position despite de-energization of control relay CR1 or the opened normally-closed CR3-12.

A second limit switch LS2 is provided mechanically coupled to the movable element 20 of autotransformer 10, as shown by the dashed line 54 and actuated to a first position 56 when the movable element 20 is in its zero or minimum voltage position, and to a second position 58 when the movable element 20 reaches a maximum voltage position or any other predetermined voltage position above minimum and less than maximum. Limit switch LS2 is also preferably of the type which is normally spring-biased to its position 56, referred to as the "normally closed" position, position 58 being referred to as the "normally open" position. Limit switch LS2, when of this type, is mechanically situated so as to take its normally closed or first position 56 at all positions of element 20 other than the maximum or predetermined voltage position above minimum, at which point the connection 54 actuates limit switch LS-2 to its second or normally open position 58. As soon as element 20 is moved away from its maximum voltage position toward its zero voltage position, limit switch LS2 returns to its normally closed position 56.

Closing of start-increase switch 50 and energization of coil CR4 closes contacts CR4-3 and with coil CR1 energized thus closing contacts CR1-4, motor 34 is energized to operate the movable element 20 of autotransformer 10 toward its maximum voltage position, winding 38 being serially connected for energization by the now-closed contacts CR4-3, limit switch LS2 in its first or normally closed position 56 and the closed contacts CR1-4, the other winding section 40 and capacitor 48 being connected in shunt across-winding section 38 of motor 34. It will be seen that when the start-increase switch is released, contacts CR4-3 will be opened thus de-energizing motor 34 and stopping movement of the movable element 20 of autotransformer 10 toward its maximum voltage position. It will further be seen that when the motor 34 has driven the movable element 20 to its maximum voltage position, limit switch LS2 will be actuated to its second or normally open position 58 thus opening the energizing circuit of winding 38 of motor 34 to stop the motor.

As soon as motor 34 has driven the movable element 20 away from its zero or minimum voltage position as above described, limit switch LS1 is moved from its first or normally open position 22 to its second or normally closed position 24 thus energizing coil CR2 and closing its contacts CR2-2. It will now be seen that with the movable element 20 of autotransformer 10 in any position away from its zero or minimum voltage position, closing of decrease-stop switch 52 will energize coil CR3 thus closing its contacts CR3-3. Recalling that at this point relay coil CR1 is energized, its normally closed contacts CR1-3 will be opened and thus closing of decrease-stop switch 52 and energization of coil CR3 will energize winding section 40 of motor 34 through the now-closed contacts CR2-2 and contacts CR3-3, winding section 38 and capacitor 48 being connected in shunt across winding section 40. It will be seen that releasing the decrease-stop switch 52 at any point prior to movable element 20 reaching its zero or minimum voltage position will de-energize relay coil CR3 thus opening contacts CR3-3 to de-energize winding section 40 of motor 34 thus to stop the motor and terminate the movement of movable element 20. If, however, the decrease-stop switch 52 is maintained in the closed position so that the movable element 20 is driven by motor 34 back to the zero or minimum voltage position, at that point switch LS1 will be actuated to its first or normally open position 22 thus de-energizing relay coil CR2 which will in turn open its contacts CR2-2 to de-energize motor 34.

In the event the stop switch 28 is actuated, thereby de-energizing relay coil CR1, it will be seen that contacts CR1-5 will be opened thus de-energizing operating coil M1 and opening its contacts M1-1 and M1-2 to de-energize autotransformer 10. Contacts CR1-4 will likewise be opened thus preventing energization of motor 34 to drive movable element 20 in the voltage-increasing direction. However, it will be recalled that with limit switch LS1 in the second or normally closed position 24 responsive to movable element 20 being in any position other than its zero or minimum voltage position, relay CR2 will be energized thus contacts CR2-2 will be closed. With coil CR1 de-energized, its contacts CR1-3 will be closed thus energizing winding section 40 of motor 34 through the still-closed contacts CR2-2 and the normally closed contacts CR1-3 thus causing motor 34 to drive the movable element 20 back to its zero or minimum voltage position at which point limit switch LS1 is actuated to its first position 22 to de-energize coil CR2 and thus to open contacts CR2-2 to stop motor 34. Thus, it is seen that momentary actuation of stop switch 28 will initiate a circuit automatically to energize motor 34 to return the movable element 20 of autotransformer 10 back to the zero voltage position.

As in the embodiment of FIG. 1, the voltage-controlling device 10 may take the form of a motor-driven rheostat in either a direct current or an alternating current supply, the secondary of a wound-rotor polyphase motor, or may be a motor driven valve in a hydraulic or pneumatic line. Furthermore, it will be readily seen that the windings 38 and 40 with the capacitor 48 omitted, may be the "up" and "down" windings of a solenoid actuator. Further, it will be understood that motor 34 will be connected to drive a mechanical element in opposite directions between the two limits established by the limit switches LS-1 in its first position and LS-2 in its second position. It will be readily seen that other types of reversible motors, such as split series field commutator-type motor may be employed.

Referring now to FIG. 5 in which like elements are still indicated by like reference numerals, the output of the variable voltage autotransformer 10 is shown as being coupled through a suitable bridge rectifier 60 to energize the armature 62 of a direct current motor 64 having a separately excited shunt field winding 66. Another variable voltage autotransformer 68 is provided having its input terminals 70 and 72 respectively connected to the input terminals 12 and 14 of the autotransformer 10 for energization from lines L3, L4 through line contacts M1-1 and M1-2. The output terminal 74 of autotransformer 68 which is connected to input terminal 70 and the adjustable element 76 are connected to energize shunt field winding 66 of motor 64 through a suitable bridge rectifier 78.

In this embodiment, the movable element 20 of the armature supply autotransformer 10 is driven by series commutator-type drive motor 80 through a suitable speed reducer, as shown by the dashed line 82, and the movable element 76 of the field supply autotransformer 68 is driven by another suitable series commutator-type motor 84 through a suitable speed reducer, as shown by the dashed lines 86.

Limit switch LS1 is actuated by movable element 20 of armature supply autotransformer 10 between its first or normally open position 22 when the movable element 20 is at its zero or minimum voltage position and a second or normally closed position 24 when the movable element 20 is moved away from the zero or minimum voltage position. In this embodiment, limit switch LS2 has two sets of contacts 88 and 90, operated in tandem and identified as LS2-1 and LS2-2, actuated by the movable element 20 of armature supply autotransformer 10, as shown by dashed lines 92 between first or normally-closed positions 94, 96 when the movable element 20 is in its zero or minimum voltage position and second positions 98, 100

(normally-open) when the movable element 20 is in its maximum voltage position. A third limit switch LS3 is provided actuated by the movable element 76 of field supply autotransformer 68, as shown by the dashed lines 102, between a first or normally open position 104 when movable element 76 is in a predetermined minimum voltage position, and a second or normally closed position 106 when the movable element 76 is away from its predetermined minimum voltage position. A fourth limit switch LS4 is provided actuated by the movable element 76 of the field supply autotransformer 68, as shown by the dashed lines 108, between a first or normally closed position 110 when the movable element 76 is away from its maximum voltage position, and a second or normally open position 112 when the movable element 76 is at its maximum voltage position. It will be understood that limit switches LS3 and LS4 operate independently, only one at a time, respectively at the opposite limits of travel of movable element 76 of autotransformer 68.

In this embodiment, it is desired that the armature voltage not be increased until field voltage is at a maximum, that the field voltage not be decreased until the armature voltage is at a maximum, and that the armature voltage not be decreased until the field voltage is at a maximum. It will now be assumed that the system is completely de-energized with the movable elements 20 and 70 of the armature and field supply autotransformers 10 and 68 both in their minimum voltage positions, as shown, and with the limit switches LS1, LS2, LS3 and LS4 thus respectively in the positions shown. In this embodiment, motors 80 and 84 are respectively energized from lines L1, L2, which are respectively connected to a suitable source of single phase alternating current potential through suitable bridge rectifiers 114 and 116. With this assumption, when power is initially applied to lines L1, L2, and prior to closing the start-increase switch 50, relays CR1, CR2, CR3 and CR4 and line contactor M1 will be de-energized and thus, line contactor coil M1 cannot at this point be energized to close line contacts M1–1 and M1–2 since contact CR1–5 in the circuit of coil M1 will be opened. In addition, recalling that limit switch LS4 is in its normally closed position 110 at all positions of movable element 76 of field supply autotransformer 68 away from the full field position, operating coil CR5 will be energized from across lines L1, L2 opening contacts CR5–5 further to inhibit energization of line contact coil M1. Under these conditions by suddenly energizing lines L1 and L2, field drive motor 84 will be energized with current flowing through its armature in the direction shown by the arrow 118 so as to drive the movable element 76 of field supply autotransformer 68 toward its full field position by a series circuit starting with line 120 through series field 122, limit switch LS3 in its position 104, armature 124, the now-closed contacts CR5–3, the normally closed contacts CR1–9 of de-energized relay CR1, and line 126. When the motor 84 has driven movable element 76 of field supply autotransformer 68 to its full field position, limit switch LS4 is moved to its second position 112 thus de-energizing coil CR5 and in turn opening contacts CR5–3 to de-energize drive motor 84.

When movable element 76 of field supply autotransformer 68 is moved slightly away from its minimum field position, limit switch LS3 is released to snap to its normally closed position 106. Energization of motor 84 continues, however, through the circuit beginning with line 120, series field 122, normally closed contacts CR4–6, normally closed contacts CR1–11, limit switch LS3 in its normally closed position 106, armature 124 in the direction shown by arrow 118, the now closed contacts CR5–3, and normally closed contacts CR1–9 to line 126. When the full field position is reached by element 76, the above-referred to de-energization of CR5 closes contacts CR5–4 to short circuit armature 124 through normally closed contacts CR4–6, normally closed contacts CR1–11, and limit switch LS3 in its normally closed position 106.

It will now be seen that if the movable element 76 of the field supply autotransformer 68 is in any position other than its full field position when lines L1, L2 are initially energized, or if with lines L1, L2 energized stop switch 28 is opened, to de-energize relay coil CR1, drive motor 84 will be energized in the proper sense automatically to drive movable element 76 to the full field position. It will be seen without further study of the circuit of armature supply drive motor 80 that under these circumstances, i.e., with the movable element 20 of the armature supply autotransformer 10 in its zero or minimum voltage position thus de-energizing coil CR2 and with coil CR1 de-energized, the drive motor 80 will not be energized since there are opened contacts in each of the lines by which it may be energized from the bridge rectifier 114, i.e., contacts CR2–3, contacts CR3–5 and contacts CR1–8.

With the movable element 76 of the field supply autotransformer 68 advanced to its full field position as above-described thus causing limit switch LS4 to move to its second or normally open position 112 to de-energize relay coil CR5, contacts CR5–5 in the circuit of operating coil M1 are closed. Now, closing of the start-increase switch 50 will energize coil CR4 in turn causing energization of coil CR1 as described above in connection with FIG. 2. Energization of coil CR1 will close contacts CR1–5 thus energizing operating coil M1 from across lines L1, L2 through normally closed contacts OL–1, normally closed contacts M1–4, normally closed contacts CR2–5 and normally closed contacts CR5–5 and contacts CR1–5. A field loss relay FL is provided with its coil in series with field winding 66 of motor 64 and if the field is not open and is, in fact, energized, coil FL will be energized thus closing contacts FL–1 in series with operating coil M1 thus shunting the normally closed contacts M1–5. Energization of operating coil M1 will close its auxiliary contacts M1–4 shunting contacts CR2–5 and CR5–5.

With the start-increase switch 50 closed and with relays CR4 and CR1 thus energized, and under the full field condition with relay coil CR5 de-energized, as above-described, a circuit will be established from line 126 through series field winding 128, through normally closed contacts CR2–4 and also through normally closed contacts CR3–4 and the now-closed contacts CR1–7 through armature 130, limit switch LS2–1 in its first position 94, normally closed contacts CR5–2, the now closed contacts CR4–5 and the now-closed contacts CR1–8 to line 132. Current thus flows through the armature 130 in the direction shown by the arrow 134 thereby energizing the drive motor 80 to move the movable element 20 of the armature supply autotransformer 10 toward the maximum armature voltage position. It will be observed that with the start increase switch 50 closed and coil CR4 energized, contacts CR4–4 are open. If before reaching the maximum armature voltage position of movable element 20, the start-increase switch 50 is opened, relay coil CR4 will be de-energized thus opening contact CR4–5 to de-energize motor 80 thus stopping movement of the movable element 20. Under this condition, contacts CR4–4 will close, short circuiting the armature 130 through limit switch LS2–1 in its normally closed position 94. When the start-increase switch 50 is maintained closed until the movable element 20 has been moved by motor 80 to its maximum armature voltage position, limit switch LS2–1 will move to its second or normally open position 98 thus again breaking the energizing circuit for motor 80 and short circuiting the armature through contacts CR3–4 and CR1–7.

It will now be recalled that as soon as the movable element 20 of the armature supply autotransformer 10 is moved away from its zero or minimum voltage position, limit switch LS1 will move to its second or normally closed position 24 thus energizing coil CR2. If at any time when the movable element 20 of the armature supply autotransformer 10 is away from its minimum voltage position the stop switch 28 is actuated thereby to de-energize coil CR1, another circuit is established to operate motor 80 in the opposite direction to return movable element 20 to its minimum voltage position. Thus, with coil CR2 still energized and coil CR1 de-energized, contacts CR2–3 and CR1–6 will be closed and a circuit is thus established again starting with line 126 through field winding 128, normally closed contacts CR4–4 and limit switch LS2–1 in its second position 98, or directly through the limit switch LS2–1 in its first or normally closed position 94, through armature 130 in the direction shown by the arrow 136, and through contacts CR2–3 and CR1–6 to line 132. It will be observed that the short circuit across armature 130 occasioned by the limit switch LS2–1 moving to its second or normally open position 98 is removed by virtue of the de-energization of coil CR1 and the opening of contact CR1–7. When as above described, motor 80 has moved the movable element 20 of the armature supply autotransformer 10 back to its zero or minimum voltage position, limit switch LS1 returns to its first or normally open position 22 thereby de-energizing coil CR2 and opening contacts CR2–3 to de-energize motor 80.

It will now be seen that with the movable element 20 of the armature supply autotransformer 10 in any position other than its zero or minimum voltage position, initial energization of lines L2 and L1 or actuation of the stop switch 28 will energize motor 80 to return the movable element 20 to its minimum voltage position.

Assuming now again that the movable element 76 of the field supply of autotransformer 68 is in its maximum voltage position thus moving limit switch LS4 to its second or normally open position 112 and de-energizing relay coil CR5, and assuming that movable element 20 of the armature supply autotransformer 10 has been moved to a position away from its minimum voltage position so that relay CR2 is energized, closing of the stop-decrease switch 52 thereby energizing coil CR3 will establish a circuit to energize motor 80 so as to move the movable element 20 back toward its zero or minimum voltage position so long as switch 52 is closed. Thus, a circuit is established through line 126, series field winding 128, limit switch LS2–1 in its second position 98 or normally closed contacts CR4–4 and limit switch LS2–1 in its first or normally closed position 94, through armature 130 in the direction shown by the arrow 136, through the now-closed contacts CR3–5, through the still closed contacts CR2–6, and through the normally closed contacts CR5–1 back to line 132. Opening of stop-decrease switch 52 before movable element 20 has reached its zero or minimum voltage position will de-energize coil CR3 thus opening contacts CR3–5 to de-energize motor 80 and establishing a short circuit across the armature 130 through normally closed contacts CR3–4, contacts CR1–7, the armature 130, the limit switch LS2–1 in its first or normally closed position 94 and the normally closed contacts CR4–4.

If the stop-decrease switch 52 is maintained closed until the movable element 20 of the armature supply autotransformer 10 reaches its zero or minimum voltage position, limit switch LS1 is returned to its first or normally open position 22 thereby de-energizing coil CR2, and opening contacts CR2–6 thereby to de-energize the drive motor 80.

It will be readily seen that normally closed contacts CR5–2 are serially connected in the circuit of drive motor 80 in the speed-increasing direction and it will be recalled that coil CR5 is energized through limit switch LS4 at all positions of movable element 76 of the field supply autotransformer 68 other than the full field position. Thus, contacts CR5–2 will be closed thereby permitting operation of drive motor 80 to increase the armature voltage only under the full field condition when coil CR5 is de-energized. It will further be seen that with full field voltage, the armature voltage can be increased or decreased at will.

Recalling now that one of the objectives of the invention is to permit decrease of field voltage (and thus increase the speed) only with full armature voltage, it will be seen that decrease of field voltage must be accomplished through energization of coil CR4 and closing of CR4 contact. The only normally open CR4 contact in the circuit of field supply drive motor 84 is CR4–7 in line 138. It will be observed that with relay CR1 energized thus closing contacts CR1–12 and with CR4–7 closed responsive to closing of start-increase switch 50 and energization of coil CR4, contacts CR1–11 will be opened along with contacts CR4–6 and thus with limit switch LS2–2 in its first or normally closed position 96 responsive to the movable element 20 of the armature supply autotransformer 10 being at a position other than its maximum armature voltage position, no path is provided for current flow through armature 124 of motor 84 in the direction shown by the arrow 140 in order to operate the motor so as to move the movable element 76 of the field supply autotransformer 68 toward the minimum field voltage position.

It will be recalled that limit switch LS–3 is in its second or normally closed position 106 at all positions of movable element 76 other than a predetermined minimum field voltage. Thus, under the full field condition, which is the only condition under which movable element 20 of the armature supply autotransformer 10 can be advanced to its full armature voltage position, limit switch LS3 will be in its second or normally closed position 106. With full armature voltage and thus with limit switch LS2–2 at its second or normally open position 100, closing of the start-increase switch 50 to energize relay coil CR4 will establish a circuit through line 120, series field 122, normally closed contacts CR5–4 (recalling that in the full field position relay coil CR5 is de-energized), through armature 124 the direction shown by the arrow 140, limit switch LS–3 in its second or normally closed position 106, limit switch LS2–2 in its second or normally open position 100, the now-closed contacts CR4–7, and the now-closed contacts CR1–12 to line 126. As soon as movable element 76 moves away from the full field position, limit switch LS–4 will move to its first or normally closed position 110 thus energizing coil CR5, opening contact CR5–4 and closing contact CR5–3 so that the normally closed contacts CR5–4 are now shunted by the now-closed contacts CR1–10, the normally closed contacts CR3–6 and the now-closed contacts CR5–3. If the start-increase switch 50 is opened thus de-energizing coil CR4 prior to the movable element 76 of the field supply autotransformer 68 reaching its minimum field position, contacts CR4–7 will be opened thus de-energizing motor 84 and contact CR4–6 will be closed thus short circuiting the armature. When the movable element 76 reaches its minimum field voltage position, limit switch LS–3 will move to its first or normally open position 104 thus breaking the above described energizing circuit for motor 84 and again placing a short circuit on the armature through the contacts CR1–10, CR3–6, and CR5–3.

If it is now desired to decrease the speed by returning the field voltage toward its maximum position, the stop-decrease switch 52 is closed thereby energizing coil CR3 opening contacts CR3–6 and closing contacts CR3–7 so that a circuit is again established from line 120 through series field winding 122, limit switch LS3 in its first or normally open position 104, or normally closed contacts CR4–6, limit switch LS2–2 in its second or normally open position 100, and limit switch LS–3 in its second or normally open position 106, through armature 124 in the direction shown by the arrow 118, through the now-closed contacts CR5–3, and through the now-closed contacts CR3–7. Again, when the movable element 76 reaches the full field position, limit switch LS–4 moves to second or normally open position 112 thus de-energizing coil CR5 and opening contact CR5–3 thereby to de-energize motor 84, contacts CR5–4 closing to place a short circuit on the armature.

It will be seen that if at any time the drive motor 64 loses its field, the coil FL of the field loss relay will be de-energized thus opening contacts FL–1 and de-energizing the operating coil M1 thereby opening the line contacts M1–1 and M1–2. An overload relay is also provided having a coil or other sensing element OL in series with the armature 62 of motor 64. If at any time an excessive armature current is drawn, overload coil OL will be sufficiently energized to open its contacts OL–1 in series with operating coil M1 again to open the line contacts M1–1 and M1–2.

It will now be seen that with the above described circuit, the armature of the motor 64 cannot be energized other than in the full field voltage and minimum armature voltage positions of the field supply autotransformer 68 and the armature supply autotransformer 10, repectively. It will further be seen that the field voltage cannot be reduced other than in the full armature voltage position of the armature supply output autotransformer 10 and contrariwise, that the armature voltage cannot be decreased other than in the full field position of the field autotransformer 68. It will further be seen that with the start-increase switch 50 maintained closed, the speed of motor 64 will continuously be increased first by driving the armature supply autotransformer 10 to its full armature voltage position and then by sequentially driving the field supply autotransformer 68 to its minimum field voltage position. Contrariwise, assuming the full armature voltage and minimum field voltage positions of the armature supply autotransformer 10 and field supply autotransformer 68 respectively, continuously maintaining the stop-decrease switch 52 closed will sequentially increase the field voltage to its maximum condition and then decrease the armature voltage to its minimum level following which the line contacts M1–1 and M1–2 will be opened to de-energize the drive motor 64. It will additionally be seen that momentarily actuating the stop switch 28 will immediately open the line contacts M1–1 and M1–2 and also simultaneously cause restoration of the armature supply autotransformer 10 to its minimum voltage condition and restoration of the field supply autotransformer 68 to its maximum voltage condition. Further, failure of the power supply from which lines L1 and L2 are energized will similarly result in opening of the line contacts M1–1 and M1–2 and upon restoration of the power, will return the armature and field supply autotransformers 10, 68 to their minimum armature voltage and full field voltage conditions respectively.

It will be readily seen that as in the system of FIG. 4, the voltage control devices 10, 68 may be motor driven rheostats rather than variable voltage autotransformers. Further, it will be seen that the system is applicable to a Ward Leonard drive system with the variable voltage autotransformer 10, for example, supplying the field of the supplying direct current generator and the variable voltage autotransformer 68 supplying the field of the driven motor.

Referring now to FIG. 6 in which like element are still indicated by like reference numerals, only the circuits of the two operating motors for the armature and field supply autotransformers 10 and 68 are shown, the supply circuit 142 for the drive motor 64 and the control circuit 144 being identical with that shown in FIG. 3. Here, the armature and field operating motors 80 and 84 are shown as being of the two-phase, permanent-capacitor, instantly-reversible type, the armature operating motor 80 having field winding parts 146 and 148 with their ends connected by capacitor 150 and the field operating motor 84 having field winding parts 152 and 154 with their ends connected by capacitor 156.

Again assuming a condition with the armature supply autotransformer 10 at a position other than minimum armature voltage and the field supply autotransformer 68 at a position other than full field voltage, and with relay CR1 de-energized either through actuation of stop switch 28 or failure of the power source to which lines L1 and L2 are connected, and with relay CR2 energized, as by the power source being restored in the case of power failure, relay CR5 will be energized through limit switch LS4 in its first or normally closed position 110. Thus, winding section 154 of field drive motor 84 will be energized through the now-closed contacts CR5–6a and the normally closed contacts CR1–15a thus to drive movable element 76 of field supply autotransformer 68 to the full field position at which time switch LS4 opens, de-energizing coil CR5 and opening contact CR5–6a. Likewise winding section 148 of armature operating motor 80 will be energized through the now-closed contacts CR2–6 and normally closed contacts CR1–14, return of the movable element 20 of the armature supply autotransformer 10 to its minimum voltage position moving limit switch LS1 to its first or normally open position 22 thus de-energizing coil CR2 and opening contacts CR2–6.

With this condition, closing of the start-increase switch 50 to energize coil CR4 will again energize coil CR1 as above described to energize operating coil M1 and close line contacts M1–1 and M1–2. Energization of coil CR4 will energize winding section 146 of armature operating motor 80 through the now-closed contacts CR4–8, limit switch LS2 in its first or normally closed position 94 and the now-closed contacts CR1–15. When the armature operating motor 80 drives the movable element 20 of the armature supply autotransformer 10 to the full armature voltage position, limit switch LS2 will move to its second or normally open position 98 thus de-energizing the armature operating motor 80. Recalling that in the full field position of field supply autotransformer 68, limit switch LS3 will be in its second or normally closed position 106, continued actuation of the start-increase switch 50 will energize winding section 152 of field operating motor 84 through the now-closed contacts CR4–9, limit switch LS3 in its second or normally closed position 106, limit switch LS2 in its second or normally open position 98, and the now-closed contacts CR1–15, thereby moving the movable element 76 toward the minimum field position at which point limit switch LS3 will move to its normally open position 104 thus de-energizing the motor 84. Field operating motor 84 can, however, be energized in the opposite direction to move element 76 toward the full field position by actuation of stop-decrease switch 52 thereby closing contacts CR3–8 thus energizing winding section 154 of motor 84 through the now-closed contacts CR5–6 and the now-closed contacts CR3–8. It will be observed that in a condition other than full field, relay CR5 is energized thus opening contacts CR5–6 and with relay CR1 energized thus opening contacts CR1–14, the armature voltage may not be reduced until the full field condition has been restored thus de-energizing relay CR5 and causing contacts CR5–6 to be closed.

It will be readily apparent that the mode of operation of the system shown in FIG. 6 is identical to that described above in connection with FIG. 5.

It will be seen that the systems of FIGS. 5 and 6 are particularly applicable to variable speed drives such as printing press drives, calendar roll drives, lathes, mills, reversing planer drives, wire drawing and the like, wherein precise and yet convenient speed adjustment of a direct current motor is desired. It will further be observed that the system automatically provides for the requisite sequence of speed increase and speed decrease with only three control switches or buttons being required, i.e., the start-increase switch 50, the stop-decrease switch 52 and emergency stop switch 28.

It will be readily understood that in a system employing a large main drive motor 64, an assembly of massive, high current variable voltage components is required for supplying the armature voltage whereas the field voltage supply components are not required to supply such heavy current. Thus, it may be desirable in such a heavy duty system to employ a high starting torque commutator-type motor 80 with the accompanying circuitry as shown in FIG. 5 for operating element 20 of armature supply autotransformer 10, and a reversible alternating current motor 84 with the circuitry shown in FIG. 6 for operating element 76 of field supply autotransformer 68.

Referring now to FIG. 7 in which like elements are still indicated by like reference numerals, there is shown a variable speed direct current motor drive system employing the same control circuitry 144 as shown in FIG. 5 and described above, and employing the armature and field supply operating motors 80 and 84 and associated circuitry as shown in FIGS. 5 or 6, only these features of the system which differ from FIGS. 5 or 6 being shown.

Referring briefly back to FIG. 5, it will be seen that both the armature 62, and field 66 are energized through contacts M1–1, 2 and that the M1 coil is energized through normally open field loss relay contacts FL–1 in shunt with its own normally closed contacts M1–5. Due to the reactance of the shunt field 66 and inertia of the field loss relay FL, the field current may not increase sufficiently rapidly to close contacts FL–1 before contacts M1–5 open so that main contactor coil M1 may never pick up, or M1 may chatter before finally sealing in.

In the system of FIG. 7, the field 66 is energized through separate contacts M2–1 and M2–2 operated by coil M2. Coil M2 is connected in shunt across coil M1 and field loss contacts FL–1 by normally open contacts CR1–17. Thus, when CR1 is energized as above-described, contacts CR1–17 close energizing coil M2 through normally closed overload relay contacts OL–1, normally closed contacts CR2–5 and CR5–5, and the now-closed contacts CR1–5. Contacts M2–1, 2 are thus closed, motor 84 increasing the field to a maximum value if it is not already at a maximum, as above-described, and when the field current has increased sufficiently to energize coil FL and to close contacts FL–1, coil M1 will be energized.

It may further be desirable to provide for both dynamic and mechanical braking of main drive motor 64, and thus the additional circuitry of FIG. 7 now to be described is provided. A suitable grid resistor 158 is connected in shunt across armature 62 by normally open contacts DB–1. Dynamic braking is selectively provided by switch 160 which connects coil BR for energization across lines L1, L2 by normally closed time delay relay contacts TDR–1 and normally open contacts M1–7. Thus, when armature supply contactor M1 is picked up closing contacts M1–7, with switch 160 closed, coil BR is energized, being sealed in by its normally open contacts BR–1 in shunt with contacts M1–7.

Dynamic braking relay coil DB is connected for energization across lines L1, L2 by normally open contacts BR–2 and normally closed contacts M1–6. The coil of a conventional mechanical brake 162 is connected in shunt with coil DB, brake 162 being coupled to the shaft of armature 62 as shown by the dashed line 164. The coil or heater 166 of a time delay relay TDR is connected in shunt with coil DB and the brake coil 162 by the normally closed contacts Z of a conventional zero speed switch coupled to the shaft of armature 62, as shown by dashed line 168. A normally closed contact CR1–18 connects coil M2 for energization through contacts BR–2 and M1–6.

It will now be seen that with switch 160 closed and coil BR energized, and with coil M1 energized as above-described, coil DB, the brake coil 162 and the time delay relay TDR will all be de-energized since contacts M1–6 will be open. Now, if for any reason relay CR1 is de-energized, as by opening stop switch 28, or holding decrease-stop switch 52 closed until motor 80 returns element 20 to its zero voltage position, all as above-described, coil M1 will be de-energized due to opening of contacts CR1–5, thus opening contacts M1–1, 2 to disconnect armature 62 from lines L3, L4. However, coil M2 remains energized through the now closed contacts CR1–18, BR–2 and M1–6, thus maintaining field on the motor. Coil DB is likewise energized through contacts BR–2 and M1–6 thereby closing contacts DB–1 to connect grid resistor 158 in shunt with armature 62 to provide dynamic braking. The brake coil in shunt with coil DB is also energized to apply mechanical braking to the armature 62.

While the armature 62 is rotating, contacts Z of the zero speed switch will be opened. When the armature 62 slows down to substantially zero speed, contacts Z close thus energizing TDR. After a sufficient time delay to insure that the armature 62 has come to a dead stop, contacts TDR–1 open thus de-energizing coil BR, in turn de-energizing coils M2, DB and 162 by opening contacts BR–2. It will be recalled by reference to FIGS. 5 and 6, that when control relay CR1 is de-energized, motor 84 is energized to restore full field voltage, if it is not already at a maximum. Thus the field excitation if not already at a maximum, is rapidly increased to maximum to insure maximum dynamic braking effort.

If dynamic braking alone (without mechanical braking) is desired, the system of FIG. 7 may be simplified as shown in FIG. 8 in which like elements are still indicated by like reference numerals. Here, field contactor coil M2 is energized by normally open contacts CR1–20. Dynamic braking selector switch 160 connects normally closed contacts M1–8 and normally open zero speed switch contacts Z–1 in shunt with contacts CR–20, and also connects dynamic braking relay coil DB in series with normally open contacts M1–9.

Now with switch 160 closed and armature 62 rotating thus closing contacts Z–1, if control relay CR1 is de-energized for any reason, as above described, M1 will drop out due to opening of contacts CR1–5, thus closing contacts M1–8. Field contactor coil M2 will thus remain energized through contacts M1–8 and Z–1 and switch 160 and dynamic braking coil DB will be energized through contacts M1–9, thus closing contacts DB–1 (FIG. 7) to connect grid resistor 158 in shunt across armature 62. When the armature rotation stops, zero speed switch contacts Z–1 will open thus de-energizing coils M2 and DB.

It will now be seen that in the system of both FIGS. 7 and 8, with the dynamic braking selector switch 160 closed, momentary opening of the stop switch 28 (or returning element 20 of armature supply autotransformer to the zero voltage position) initiates a sequence of operations wherein the armature is disconnected from the armature supply voltage, the grid resistor is connected across the armature and the field voltage is maintained, and if not at a maximum, is rapidly increased to a maximum.

In those applications where it is desirable to employ both mechanical and dynamic braking, the forces of both systems are simultaneously applied in the system of FIG. 7 by momentarily opening stop switch 28, or returning element 20 to the zero voltage position. It will be observed in the system of FIG. 7 that whereas the retarding force of dynamic braking fades out as zero speed is approached, the zero speed switch Z initiates a timing period for maintaining the mechanical braking effort until a dead stop is obtained.

The systems shown in FIG. 4 and the following figures employ momentary contact switches 50 and 52 for respectively increasing and decreasing the load voltage (FIG. 4) or the drive motor speed (FIG. 5 et seq.). It may in certain applications be desirable to provide a single control knob which may be manually turned to a calibrated position to obtain the desired voltage or motor speed.

Referring now to FIG. 9, there is shown a single knob control arrangement for replacing switches 50 and 52 in the system of FIG. 4. Here, control knob is connected by shaft 172 to rotate cams 174 and 176, which are respectively axially displaced on shaft 172. Cam follower roller 178 cooperates with cam 174 and is carried by a switch arm 180 which is pivotally mounted on disc 182. Disc 182 is rotatably mounted on shaft 172 and axially spaced from cams 174, 176. Switch arm 180 is normally biased against stop 184 on disc 182 by spring 186 when roller 178 is on dwell portion 188 of cam 174. Switch arm 180 and contact 192 are serially connected with relay coil CR4, replacing start-increase switch 50 in FIG. 4. It will be seen that rotation of cams 174, 176 by knob 170 in the direction shown by the arrow 194 will cause roller 178 to ride up on rise portion 190 of cam 174 thereby causing switch arm 180 to engage contact 192 to energize coil CR4.

Similarly, cam follower roller 196 cooperates with cam 176 and is carried by switch arm 198 which is pivotally mounted on disc 182. Switch arm 198 is normally biased against stop 200 on disc 182 by spring 202 when roller 196 is on dwell portion 204 of cam 176. Switch arm 198 and contact 206 are serially connected with relay coil CR3, replacing decrease-stop switch 52 in FIG. 4. It will be seen that rotation of cams 174, 176 by knob 170 in the direction shown by the arrow 208 will cause roller 196 to ride upon rise portion 210 of cam 176 thereby causing switch arm 198 to engage contact 206 to energize coil CR3.

Motor 36 which drives movable element 20 of autotransformer 10 also simultaneously rotates disc 182 through suitable gearing, shown schematically at 212. Control knob 170 is calibrated, as at 214 to provide the desired output voltage at output terminals 16, 18.

Assuming now that the desired output voltage corresponds to a 30° rotation of cams 174 and 176 in the direction shown by arrow 194, when knob 170 is thus turned by 30° in direction 194, roller 178 will ride up on rise portion 190 of cam 174 causing switch arm 180 to engage contact 192 thus to energize relay coil CR4 and in turn to cause motor 34 to advance element 20 away from its zero voltage position, as described above in connection with FIG. 4. Operation of motor 34 simultaneously rotates disc 182 in direction 194 for the 30° by which cams 174 and 176 were rotated, following which roller 178 rides back onto dwell portion 188 causing switch arm 180 to move away from contact 192 thus de-energizing relay coil CR4 and stopping motor 34, element 20 having thus been advanced to provide the desired output voltage corresponding to the 30° rotation of cams 174, 176.

If it is now desired to reduce the output voltage, control knob 170 is rotated in the direction shown by arrow 208 to the desired voltage setting thus rotating cams 174, 176 in that direction. This causes roller 200 to ride up on rise portion 210 of cam 176 in turn causing switch arm 198 to engage contact 206 to energize relay coil CR3. This energizes motor 36, as above described, to return element 20 toward the zero voltage position which also rotates disc 182 in the direction 208 until roller 200 rides back onto dwell portion 204 causing switch arm 198 to move away from contact 206 to de-energize relay coil CR3 and stop motor 36.

Referring now to FIG. 10, a modification of the single knob control arrangement of FIG. 9 is shown for use with the system of FIG. 5 wherein two control motors 80 and 84 are employed. It will be recalled that in that embodiment, in order to increase the speed of main drive motor 64 (with the field voltage at a maximum), the armature voltage is first advanced to a maximum, and the field voltage is then reduced.

In FIG. 10, cams 174, 176, control knob 170, the switch arms 180, 198 and associated rollers 178, 200, contacts 192, 206, and relay coils CR3, CR4 are not shown since they are identically associated with disc 182. Here, control motor 80 which operates movable element 20 of armature supply autotransformer also drives gearing 220 to rotate disc 182 through electro-magnetic clutch 216 energized by coil 218 in series with armature 130; thus when armature 130 is energized, coil 218 actuates clutch 216 to connect motor 80 to drive disc 182. Likewise, control motor 84 which operates movable element 76 of field supply autotransformer 68 also drives gearing 226 to rotate disc 182 through electromagnetic clutch 222 energized by coil 224 in series with armature 124.

Now assuming knob 170 is rotated in direction 194 (FIG. 9) by an amount preselected to provide the desired speed for drive motor 64, cam 174 will thus cause switch arm 180 to engage contact 192 to energize coil CR4. As described in connection with FIG. 5 above, energizing relay CR4 will cause motor 80 to advance element 20 of armature supply transformer 10, simultaneously rotating disc 182, as above described. Motor 84 is never simultaneously energized with motor 80, and thus, its clutch 222 is de-energized so that rotation of disc 182 by motor 80, while rotating gearing 226, does not rotate motor 84 and thus affect element 76 of field autotransformer 68. Thus if the speed called for by rotation of knob 170 is supplied by merely advancing element 20, rotation of disc 182 by motor 80 through gearing 220 will cause de-energization of coil CR4 and stopping of motor 80 at the proper point.

Assuming, however, that the speed of motor 64 called for requires advance of the armature voltage to a maximum and subsequent reduction of the field voltage. Under these circumstances, when motor 80 has advanced element 20 to the maximum armature voltage position, gearing 220 will not have rotated disc 182 sufficiently to de-energize relay CR4 and motor 84 will then be energized to drive element 76 toward the minimum field voltage position, as described above in connection with FIG. 5. Motor 84 now advances disc 182 through gearing 226, the additional rotational amount to cause de-energization of coil CR4, it being observed that clutch coil 218 associated with motor 80 is now de-energized so that the additional rotation of disc 182 and gearing 220 does not rotate motor 80 and thus does not effect the setting of element 20 of armature autotransformer 10.

It will be readily seen that a speed reduction is provided in the same fashion, but in reverse sequence. It will be observed that the system of FIG. 10 provides automatic acceleration and deceleration at a controlled rate regardless of the speed of movement of control knob 170.

It will readily be seen that the invention provides an energy control system in which start-up can be accomplished only with the adjustable elements in a predetermined position, and in which the functions required for start-up and shut-down are automatically accomplished in the required sequence.

While there is illustrated and described specific embodiments of the invention, further modifications and improvements will occur to those skilled in the art and it is desired therefore in the appended claims to cover all modifications which do not depart from the spirit and scope of the invention.

What is claimed is:

1. In combination with a source of power having output means movable between normal and second positions to thereby vary the quantity of power supplied and selectively actuable means for supplying energy to said source; a circuit for preventing energization of said source without first returning said movable means to said normal position thereof comprising: limit switch means actuated by said movable means to a first position when said movable means is in its normal position and to a second position when said movable means is away from its normal position, a source of potential, first means energized by said potential source for establishing a first circuit through said limit switch means when in said first position thereof, said first means including means responsive to energization of said first means for maintaining said first circuit energized when said limit switch means has moved to said second position thereof, said first means including means responsive to energization thereof for actuating said actuable means, and means for selectively de-energizing said first means thereby deactuating said actuable means whereby said first means cannot be re-energized without returning said movable means to said normal position thereof thereby to actuate said limit switch means to said first position thereof.

2. The combination of claim 1 wherein said limit switch means is of the make-before-break type and includes two contact blades, said limit switch means including means for actuating both of said blades to said first position when said movable means is in its normal position, and means for sequentially actuating both of said blades to said second position when said movable means is away from its normal position.

3. The combination of claim 1 further comprising electrically energizable means connected to said movable means for operating the same between said positions thereof, first selectively actuable control means for energizing said operating means to move said movable means toward said second position thereof, second selectively actuable control means for energizing said operating means to move said movable means toward said normal position thereof, and single manually actuated control means including means for selectively actuating said first and second control means for predetermined times thereby to provide predetermined quantities of power supplied by said output means.

4. The combination of claim 3 wherein said manually actuated control means comprises: first and second cam means coupled to be rotated in unison in either direction from a neutral position by a manually actuated control member, first switching means cooperating with said first cam means and coupled to said first control means for actuating the same when said first cam means is rotated in one direction away from said neutral position, second switching means cooperating with said second cam means and coupled to said second control means for actuating the same when said second cam means is rotated in the opposite direction away from said neutral position, said first and second switching means being carried by rotatable means coaxial with said cam means, and means coupling said operating means to said rotatable means for rotating the same thereby to move said switching means to said neutral position of said cam means.

5. In combination with a source of power having output means movable between normal and second positions to thereby vary the quantity of power supplied, and selectively actuable means for supplying energy to said source; a circuit for preventing energization of said source without first returning said movable means to said normal position thereof comprising limit switch means actuated by said movable means to a first position when said movable means is in its normal position and away from said first position when said movable means is away from its normal position, a source of potential, a first relay having an operating coil, means serially coupling said limit switch means in said first position thereof with said relay coil across said potential source thereby to energize said first relay coil, said first relay having sealing contacts shunting said first position of said limit switch means responsive to energization of said first relay coil thereby maintaining the same energized when said limit switch means has moved away from said first position thereof, means including another operating coil for actuating said actuable means in response to energization of said other coil, means including second contacts on said first relay serially coupling said other coil across said potential source in response to energization of said first relay coil thereby to energize said other coil, and means for selectively de-energizing said first relay coil thereby de-energizing said other coil and deactuating said actuable means whereby said first relay coil cannot be re-energized without returning said movable means to said normal position thereof thereby to actuate said limit switch means to said first position thereof.

6. The combination of claim 5 further comprising a second relay having an operating coil, and wherein said limit switch means has a second position when said movable means is away from said normal position, means serially coupling said limit switch means in said second position thereof with said second relay coil across said potential source thereby to energize said second relay coil, said second relay having contacts serially coupling said other coil with said second contacts of said first relay when said second relay coil is de-energized, said other coil having sealing contacts shunting said second relay contacts in response to energization of said other coil.

7. The combination of claim 5 wherein said power source is an electrical device and said movable means is a voltage-controlling element of said device, and wherein said actuable means is switching means coupling said device to a source of potential and said voltage-controlling element is coupled to said limit switch means.

8. The combination of claim 7 further comprising a second electrical device having a voltage controlling element, and second switching means coupling said second device to a source of potential and having an operating coil, means including contacts on said first relay serially coupling said last-named operating coil across said potential source in response to energization of said first relay coil, and means having contacts in series with the operating coil of said first-named switching means for energizing the same only after energization of the operating coil of said second switching means.

9. In combination with an electrical voltage-controlling device having a voltage-controlling element movable between normal and second positions, switching means for connecting said device to a power source, and electrically energizable means connected to said movable element for operating the same between said positions thereof; a circuit for preventing energization of siad device without first returning said movable element to said normal position thereof comprising a limit switch coupled to said movable element and actuated thereby to a first position when said movable element is in said normal position and to a second position when said movable element is away from its normal position, first selectively actuable control mens for energizing said operating means to move said movable element toward said second position thereof, second selectively actuable control means for energizing said operating means to move said movable element toward said normal position thereof, a source of potential, a first relay having an operating coil, said first control means having first contacts which are closed when said first control means is actuated, said second control means having second contacts which are open when said second control means is actuated, means including said first and second contacts and said limit switch in said first position thereof coupling said first relay coil across said potential source thereby to energize said first relay coil when said first control means is actuated, said first relay having third contacts shunting said first position of said limit switch responsive to energization of said first relay coil thereby maintaining the same energized when said limit switch has moved away from said first position thereof, a second relay having an operating coil, means including said limit switch in said second position thereof and said second contacts serially coupling said second relay coil across said source of potential thereby to energize said second relay coil when said limit switch moves to said second position thereof and said first control means is actuated, said second relay having fourth contacts shunting said second contacts when said second relay coil is energized, means including another operating coil for actuating said switching means in response to energization of said other coil, said first relay having fifth contacts which are cleared when said first relay coil is energized, said second relay having sixth contacts, which are closed when said second relay coil is de-energized, means including said fifth and sixth contacts serially coupling said other coil across said potential source, said other coil having seventh contacts shunting said sixth contacts in response to energization of said other coil, and means for selectively de-energizing said first relay coil thereby de-energizing said other coil and de-actuating said switching means whereby said first relay coil cannot be re-energized without returning said movable element to said normal position thereof thereby to actuate said limit switch to said first position thereof.

10. The combination of claim 9 wherein said electrically energizable means includes first and second winding means, said first control means having eighth contacts which are closed when said first control means is actuated, said first relay having ninth contacts which are closed when said first relay coil is energized, means including said eighth and ninth contacts serially coupling said first winding means across said potential source for energizing the same to operate said movable element toward said second position thereof, said second relay having tenth contacts which are closed when said second relay coil is energized, said first relay having eleventh contacts which are open when said first relay coil is energized, said second control means including twelfth contacts which are closed when said second control means is energized, said eleventh and twelfth contacts being connected in parallel, and means including said tenth contacts and said parallel-connected eleventh and twelfth contacts serially coupling said second winding means across said potential source for energizing the same to operate said movable element toward said second position thereof.

11. The combination of claim 10 further comprising a second limit switch serially coupled with said first winding means and actuated to an open position thereby to de-energize said first winding means when said movable element reaches said second position thereof.

12. In combination with an electrical voltage-controlling device having a voltage-controlling element movable between normal and second positions, switching means for connecting said device to a power source, and electrically energizable means connected to said movable element for operating the same between said positions thereof, a circuit for preventing energization of said device without first returning said movable element to said normal position thereof comprising: a limit switch coupled to said movable element and actuated thereby to a first position when said movable element is in said normal position and to a second position when said movable element is away from its normal position, first selectively actuable control means for energizing said operating means to move said movable element toward said second position thereof, second selectively actuable control means for energizing said operating means to move said movable element toward said normal position thereof, a source of potential, a first relay having an operating coil, means including said limit switch in said first position thereof for energizing said first relay coil in response to actuation of said first control means, said first relay having sealing contacts shunting said first position of said limit switch responsive to energization of said first relay coil thereby maintaining the same energized when said limit switch has moved to said second position thereof, means including another operating coil for actuating said switching means in response to energization of said other coil, means including second contacts on said first relay serially coupling said other coil across said potential source in response to energization of said first relay coil thereby to energize said other coil, means for selectively de-energizing said first relay coil thereby to energize said other coil, means for selectively de-energizing said first relay coil thereby de-energizing said other coil and deactuating said switching means whereby said first relay coil cannot be re-energized without returning said movable element to said normal position thereof thereby to actuate said limit switch to said first position thereof, said first relay having other contacts coupled to disable said first control means when said first relay coil is de-energized, and other means including said limit switch in said second position thereof for enabling said second control means whereby said movable element may be returned to said normal position thereof despite de-energizaiton of said first relay coil.

13. The combination of claim 12 wherein said other means includes a second relay having an operating coil coupled for energization across said potential source by said limit switch in said second position thereof, said second relay having contacts enabling said second control means when said second relay coil is energized.

14. In combination: a first electrical voltage-controlling device having a voltage-controlling element movable between first and second positions, first electrically energizable means connected to said first device movable element for operating the same between said positions thereof; a second electrical voltage-controlling device having a voltage-controlling element movable between first and second positions, second electrically energizable means connected to said second device movable element for operating the same between said positions thereof; switching means for connecting said devices to a power source; and a circuit for preventing energization of said devices without first returning said movable elements to said first positions thereof, for preventing movement of said first device movable element toward said second position unless said second device is in said first position, and for preventing movement of said second device movable element toward said second position unless said first device is in said second position, said circuit comprising: a first limit switch coupled to said first device movable element and actuated thereby to a first position when said first device movable element is in said first position and to a second position when said first device movable element is away from its first position, a second limit switch coupled to said first device movable element and actuated thereby to a first position where said first device movable element is in said first position and to a second position when said first device movable element is in said second position, a third limit switch coupled to said second device movable element and actuated thereby to a first position when said second device movable element is in said first position and to a second position where said second device movable element moves to said second position thereof, a fourth limit switch coupled to said second device movable element and actuated thereby to a first position when said second device movable element is in said first position and to a second position when said second device movable element moves away from said first position thereof, first selectively actuable control means for respectively energizing said first and second operating means respectively to move said movable elements toward said second positions thereof, second selectively actuable control means for respectively energizing said first and second operating means to move said movable elements toward said first positions thereof, a source of potential, a first relay having an operating coil, first means including said first limit switch in said first position thereof for energizing said first relay coil in response to actuation of said first control means, said first relay having sealing contacts shunting said first position of said first limit switch responsive to energization of said first relay coil thereby maintaining the same energized when said first limit switch has moved to said second position thereof, second means including another operating coil for actuating said switching means in response to energization of said other coil, means including other contacts on said first relay serially coupling said other coil across said potential source in response to energization of said first relay coil thereby to energize said other coil, means for selectively de-energizing said first relay coil thereby de-energizing said other coil and deactuating said switching means whereby said first relay coil cannot be re-energized without returning said first device movable element to said first position thereof thereby to actuate said first limit switch to said first position thereof, said first relay having further contacts coupled to disable said first control means from energizing said first and second operating means when said relay coil is de-energized, said second limit switch in said first position being coupled to enable said first control means to energize said first operating means and to disable said first control means from energizing said second operating means, said second limit switch in said second position being coupled to disable said first control means from energizing said first operating means and to enable said first control means to energize said second operating means, said third limit switch being coupled in said second position thereof to disable said first control means from energizing said second operating means, said fourth limit switch being coupled in said first position thereof to disable said second control means from energizing said second operating means, and other means including said first limit switch in said second position thereof and said fourth limit switch in said second position thereof for enabling said second control means to energize said second operating means whereby said movable elements are returned to said first position thereof despite de-energization of said first relay coil.

15. The combination of claim 14 wherein each of said operating means includes first and second winding means, said first control means having first contacts which are closed when said first control means is actuated, said second control means having second contacts which are open when said second control means is actuated, said first means including said first and second contacts, said other means including a second relay having an operating coil serially coupled across said source by said first limit within said second position thereof and said second contacts, said second relay having third contacts shunting said second contacts when said second relay coil is energized, said first control means having fourth contacts which are closed when said first control means is actuated, one of said first operating means winding means being serially coupled for energization across said potential source by said fourth and further contacts of said first relay and said second limit switch in said first position thereby to move said first device movable element toward said second position responsive to actuation of said first control means, said second relay having fifth contacts which are closed when said second relay coil is energized, said second control means having sixth contacts which are closed when said second control means is actuated, said first relay having seventh contacts which are open when said first relay coil is energized, a third relay having an operating coil coupled across said potential source for energization in said second position of said fourth limit switch, said third relay having eighth contacts which are open when said third relay coil is energized, the other of said first operating means winding means being serially coupled for energization across said potential source by said fifth, sixth and eighth contacts thereby to move said first device movable element toward said first position thereof responsive to actuation of said second control means when said second device movable element is in said first position thereof, said seventh contacts being connected in shunt across said sixth and eighth contacts thereby energizing said other of said first operating means winding means to move said first device movable element to said first position thereof when said first relay coil is de-energized, said first control means having ninth contacts which are closed when said first control means is actuated, one of said second operating means winding means being serially coupled across said potential source by said ninth and further contacts and said second and third limit switches in said second and first positions thereof respectively and energized thereby to move said second device movable element toward said second position thereof responsive to actuation of said first control means when said first device movable element is in said second position thereof, said third relay having tenth contacts which are closed when said third relay coil is energized, said second control means having eleventh contacts which are closed when said second control means is actuated, the other of said second operating means winding means being serially coupled across said potential source by said tenth and eleventh contacts and energized thereby to move said second device movable element toward said first position thereof responsive to actuation of said second control means, said first relay having twelfth contacts which are open when said first relay coil is energized, said twelfth contacts shunting said eleventh contacts thereby energizing said other of said second operating means winding means to move said second device movable element to said first position thereof when said first relay coil is de-energized.

16. The combination of claim 14 wherein said first device movable element is adapted to be connected to the armature of a commutator type dynamoelectric machine for energizing the same, said first and second positions of said first device movable element respectively supplying minimum and maximum armature voltage, and wherein said second device movable element is adapted to be connected to the shunt field of said machine, said first and second positions of said second device movable element respectively supplying maximum and minimum field voltage.

17. The combination of claim 14 wherein each of said operating means is a series commutator-type dynamoelectric machine having an armature and a field winding, said first control means having first contacts which are closed when said first control means is actuated, said second control means having second contacts, which are open when said second control means is actuated, said first means including said first and second contacts, said other means including a second relay having an operating coil serially coupled across said potential source by said first limit switch in said second position thereof and said second contacts, said second relay having third contacts shunting said second contacts when said second relay coil is energized, said first control means having fourth contacts which are closed when said first control means is actuated, said further contacts of said first relay and said second limit switch respectively having first and second parts, means including said fourth contacts and said first parts of said further contacts and said second limit switch in said first position thereof establishing a first circuit serially coupling the armature and field winding of the first operating means for energization across a source of potential to move said first device movable element toward said second position responsive to actuation of said first control means, said second relay having fifth contacts which are closed when said second relay coil is energized, said second control means having sixth contacts which are closed when said second control means is actuated, said first relay having seventh contacts which are open when said first relay coil is energized, a third relay having an operating coil coupled across said potential source for energization in said second position of said fourth limit switch, said third relay having eighth contacts which are open when said third relay coil is energized, means including said fifth, sixth, and eighth contacts establishing a second circuit serially coupling the armature and field winding of the first operating means for energization across a source of potential to move said first device movable element toward said first position thereof responsive to actuation of said second control means when said second device movable element is in said first position thereof, said seventh contacts being coupled in said second circuit for energizing said armature and field winding of said first operating means to move said first device movable element to said first position thereof when said first relay coil is de-energized, said first control means having ninth contacts which are closed when said first control means is actuated, means including said ninth contacts, said second part of said fourth contacts, said second part of said second limit switch in said second position thereof, and said third limit switch in said first position thereof establishing a third circuit serially coupling the armature and field winding of the second operating means for energization across a source of potential to move said second device movable element toward said second position thereof responsive to actuation of said first control means when said first device movable element is in said second position thereof, said third relay having tenth contacts which are closed when said third relay coil is energized, said second control means having eleventh contacts which are closed when said second control means is actuated, means including said tenth and eleventh contacts establishing a fourth circuit serially coupling said armature and field winding of said second operating means for energization across a source of potential to move said second device movable element toward said first position thereof responsive to actuation of said second control means, said first relay having twelfth contacts which are open when said first relay coil is energized, said twelfth contacts being coupled in said fourth circuit for energizing said armature and field winding of said second operating means to move said second device movable element to said first position thereof when said first relay coil is de-energized.

18. The combination of claim 14 further comprising first and second cam means coupled to be rotated in unison in either direction from a neutral position by a single manually actuated control member, first switch means cooperating with said first cam means and coupled to said control means for actuating the same when said first cam means is rotated in one direction away from said neutral position, second switch means cooperating with said second cam means and coupled to said second control means for actuating the same when said second cam means is rotated in the opposite direction away from said neutral position, said first and second switch means being carried by rotatable means coaxial with said cam means, means coupling said rotatable means to said first operating means when the same is energized for rotating said rotatable means thereby to move said switch means toward said neutral position of said cam means, and means coupling said rotatable means to said second operating means when the same is energized for rotating said rotatable means thereby to move said switch means toward said neutral position of said cam means.

19. The combination of claim 14 further comprising a commutator-type dynamoelectric machine having an armature and a shunt field, said armature being coupled to said first voltage controlling device, said shunt field being coupled to said second voltage controlling device, said switching means comprising first and second contactors respectively coupling said first and second devices to said source, said other coil actuating said first contactor, said second means including a second operating coil actuating said second contactor, said first relay having contacts serially coupling said second coil across said source in response to energization of said first relay coil, for maintaining said second coil energized when said first relay coil is de-energized thereby maintaining said shunt field energized from said source when said armature is disconnected therefrom, means for coupling dynamic braking means across said armature when said other coil is de-energized, and final means for de-energizing said second coil and for decoupling said dynamic braking means from said armature when the speed has reduced to a predetermined amount.

20. The combination of claim 19 further comprising mechanical braking means for said motor, means for actuating said mechanical braking means when said other coil is de-energized, said final means including means for deactuating said braking means, de-energizing said second coil, and decoupling said dynamic braking means after a predetermined time delay following reduction of the speed of said motor to a predetermined amount.

21. The combination of claim 14 further comprising a commutator-type dynamoelectric machine having an armature and a shunt field, said armature being coupled to said first voltage controlling device, said shunt field being coupled to said second voltage controlling device, said switching means comprising first and second contactors respectively coupling said first and second devices to said source, said other coil actuating said first contactor, said second means including a second operating coil actuating said second contactor, said second relay having contacts serially coupling said second coil across said source in response to energization of said first relay coil, and means coupled with said field for sensing a predetermined amount of field current, said last-named means having contacts in series with said other coil for energizing the same only in response to sensing of said predetermined field current.

22. In combination: a first electrical voltage-controlling device having a voltage-controlling element movable between first and second positions, first electrically energizable means connected to said first device movable element for operating the same between said positions thereof; a second electrical voltage-controlling device having a voltage-controlling element movable between first and second positions, second electrically energizable means connected to said second device movable element for operating the same between said position thereof; switching means for connecting said devices to a power source; and a circuit for preventing energization of said devices without first returning said movable elements to said first position thereof, for preventing movement of said first device movable element toward said second position unless said second device is in said first position, and for preventing movement of said second device movable element toward said second position unless said first device is in said second position, said circuit comprising; first limit switch means coupled to said first device movable element and actuated thereby to a first position when said first device movable element is in said first position and to a second position when said first device movable element is away from its first position, second limit switch means coupled to said first device movable element and actuated thereby to a first position when said first device movable element is in said first position and to a second position when said first device movable element is in said second position, third limit switch means coupled to said second device movable element and actuated thereby to a first position when said second device movable element is in said first position and to a second position when said second device movable element moves to said second position thereof, fourth limit switch means coupled to said second device movable element and actuated thereby to a first position when said second device movable element is in said first position and to a second position when said second device movable element moves away from said first position thereof, first and second selectively actuable control means, a first relay having an operating coil, means including contacts on said first control means, said first limit switch means in said first position thereof esablishing a first circuit coupling said first relay coil for energization across a source of potential responsive to actuation of said first control means, said first relay having contacts shunting said first limit switch means responsive to energization of said first relay coil thereby maintaining the same energized when said first limit switch has moved to said second position thereof, a second relay having an operating coil, means including said first limit switch in said second position thereof establishing a second circuit coupling said second relay coil for energization across a source of potential, a third relay having an operating coil, means including said fourth limit switch in said second position thereof coupling said third relay coil for energization across a source of potential, means including another operating coil for actuating said switching means in response to energization of said other coil, means including contacts on said first, second and third relays establishing a third circuit coupling said other coil for energization across a source of potential responsive to energization of said first relay coil and de-energization of said second and third relay coils, said actuating means having contacts shunting said second and third relay contacts in said third circuit responsive to energization of said other coil, means including contacts on said first control means and said first relay and said second limit switch in said first position thereof establishing a fourth circuit coupling said first operating means for energization across a source of potential to move said first device movable element toward said second position thereof responsive to energization of said first relay coil and actuation of said first control means, means including contacts on said second and third relays and on said second control means establishing a fifth circuit coupling said first operating means for energization across a source of potential to move said first device movable element toward said first position thereof responsive to energization of said second relay and de-energization of said third relay and actuation of said second control means, means in said first circuit for selectively de-energizing said first relay coil, means including contacts on said first relay coupled to said fifth circuit for energizing said first operating means to move said first device movable element toward said first position thereof responsive to de-energization of said first relay coil, means including said second limit switch means in said second position thereof and said third limit switch means in said first position thereof and contacts on said first control means establishing a sixth circuit coupling said second operating means for energization across a source of potential for moving said second device movable element toward said second position thereof responsive to actuation of said first control means, means including contacts on said third relay and said second control means for establishing a seventh circuit coupling said second operating means for energization across a source of potential for moving said second device movable element toward said first position thereof responsive to energization of said third relay and actuation of second control means, and means including contacts on said first relay coupled to said seventh circuit for energizing said second operating means to move said second device movable element toward said first position thereof responsive to de-energization of said first relay coil.

23. In combination: a first electrical voltage-controlling device having a voltage-controlling element movable between first and second positions, first electrically energizable means connected to said first device movable element for operating the same between said positions thereof; a second electrical voltage-controlling device having a voltage-controlling element movable between first and second positions, second electrically energizable means connected to said second device movable element for operating the same between said position thereof; switching means for connecting said devices to a power source; and a circuit for preventing energization of said devices without first returning said movable elements to said first positions thereof, for preventing movement of said first device movable element toward said second position unless said second device is in said first position, and for preventing movement of said second device movable element toward said second position unless said first device is in said second position, said circuit comprising; first limit switch means coupled to said first device movable element and actuated thereby to a first position when said first device movable element is in said first position and to a second position when said first device movable element is away from its first position, second limit switch means coupled to said first device movable element and actuated thereby to a first position when said first device movable element is in said first position and to a second position when said first device movable element is in said second position, third limit switch means coupled to said second device movable element and actuated thereby to a first position when said second device movable element is in said first position and to a second position when said second device movable element moves to said second position thereof, fourth limit switch means coupled to said second device movable element and actuated thereby to a first position when said second device movable element is in said first position and to a second position when said second device movable element moves away from said first position thereof, first and second selectively actuable control means, means including said first limit switch means in said first position thereof establishing first circuit means energized in response to actuation of said first control means, means for maintaining said first circuit means energized when said first limit switch means has moved to said second position thereof, means including said fourth limit switch means in said first position thereof for actuating said switching means responsive to energization of said first circuit means, means for maintaining said switching means actuated when said fourth limit switch means moves to said second position thereof, means including said second limit switch means in said first position thereof for energizing said first operating means to move said first device movable element toward said second position thereof responsive to energization of said first circuit means and actuation of said first control means, means including said fourth limit switch means in said first position thereof for energizing said first operating means to move said first device movable element toward said first position thereof responsive to actuation of said second control means, means including said second limit switch means in said second position thereof and said third limit switch means in said first position thereof for energizing said second operating means to move said second device movable element toward said second position thereof responsive to energization of said first circuit means and actuation of said first control means, means including said fourth limit switch means in said second position thereof for energizing said second operating means to move said second device movable element toward said first position thereof responsive to actuation of said second control means.

24. The combination of claim 23 further comprising means for selectively de-energizing said first circuit means, and means for energizing said first and second operating means respectively to move said first and second devices movable elements to said first position thereof responsive to de-energization of said first circuit means.

25. In combination with an electrical voltage-controlling device having a voltage-controlling element movable between normal and second positions, switching means for connecting said device to a power source, and electrically energizable means connected to said movable element for operating the same between said positions thereof; a circuit for preventing energization of said device without first returning said movable element to said normal position thereof comprising first limit switch means coupled to said movable element and actuated thereby to a first position when said movable element is in said normal position and to a second position when said movable element is away from its normal position, second limit switch means coupled to said movable element and actuated thereby to a first position when said movable element is in said normal position and to a second position when said movable element is in said second position thereof, first and second selectively actutable control means, means including said first limit switch means in said first position thereof establishing first circuit means energized in response to actuation of said first control means, means for maintaining said first circuit means energized when said first limit switch means moves to said second position thereof, means for actuating said switching means responsive to energization of said first circuit means, means including said second limit switch in said first position thereof for energizing said operating means to move said movable element toward said second position thereof responsive to energization of said first circuit means and actuation of said first control means, and means for energizing said operating means to move said movable element toward said second position thereof responsive to actuation of said second control means.

26. The combination of claim 25 further comprising means for selectively de-energizing said first circuit means, and means for energizing said operating means to move said movable element to said first position thereof responsive to de-energization of said first circuit means.

References Cited by the Examiner
UNITED STATES PATENTS

| | | | |
|---|---|---|---|
| 2,515,612 | 7/1950 | Rathburn | 318—338 X |
| 2,965,809 | 12/1960 | Edsall | 317—13 |

LLOYD McCOLLUM, *Primary Examiner.*